US012489826B2

(12) United States Patent
Wang et al.

(10) Patent No.: US 12,489,826 B2
(45) Date of Patent: Dec. 2, 2025

(54) CONTENT PUSH METHOD AND DEVICE, APPARATUS, AND MEDIUM

(71) Applicant: Tencent Technology (Shenzhen) Company Limited, Shenzhen (CN)

(72) Inventors: Xiaoyu Wang, Shenzhen (CN); Dongbo Huang, Shenzhen (CN); Yonghui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 27 days.

(21) Appl. No.: 18/600,466

(22) Filed: Mar. 8, 2024

(65) Prior Publication Data
US 2024/0214466 A1 Jun. 27, 2024

Related U.S. Application Data

(63) Continuation of application No. PCT/CN2023/114348, filed on Aug. 23, 2023.

(30) Foreign Application Priority Data

Sep. 5, 2022 (CN) .......................... 202211077110.9

(51) Int. Cl.
G06F 15/16 (2006.01)
H04L 47/52 (2022.01)
(Continued)

(52) U.S. Cl.
CPC .......... *H04L 67/55* (2022.05); *H04L 47/522* (2013.01); *H04L 47/821* (2013.01)

(58) Field of Classification Search
None
See application file for complete search history.

(56) References Cited

U.S. PATENT DOCUMENTS

2014/0108190 A1* 4/2014 Kang ................. G06Q 30/0631
705/26.7
2023/0062061 A1* 3/2023 Yahata ............... G06Q 30/0267

FOREIGN PATENT DOCUMENTS

CN 104065733 A 9/2014
CN 110782286 A 2/2020
(Continued)

OTHER PUBLICATIONS

Tencent Technology, ISR, PCT/CN2023/114348, Nov. 14, 2023, 3 pgs.

*Primary Examiner* — Wing F Chan
*Assistant Examiner* — Andrew Woo
(74) *Attorney, Agent, or Firm* — Morgan, Lewis & Bockius LLP

(57) ABSTRACT

This application relates to a content push method performed by a computer device, including: determining candidate mixed content in response to a content push request from an object, the mixed content including first-type content and second-type content; determining a first priority push probability of the first-type content based on the object attribute information, the overall content feature, and the dynamic resource input feature; analyzing a priority push relationship between the content features of all pieces of second-type content, to obtain an internal priority push feature, and performing inter-type priority push relationship analysis based on the object attribute information, the internal priority push feature, and the dynamic resource input feature, to determine second priority push probabilities respectively corresponding to all pieces of second-type content; and selecting content from the mixed content for push based on the first priority push probability and the second priority push probabilities.

20 Claims, 9 Drawing Sheets

(51) Int. Cl.
*H04L 47/70* (2022.01)
*H04L 67/55* (2022.01)

(56) References Cited

FOREIGN PATENT DOCUMENTS

| | | |
|---|---|---|
| CN | 113781078 A | 12/2021 |
| CN | 114663155 A | 6/2022 |
| CN | 114943581 A | 8/2022 |
| WO | WO 2018027642 A1 | 2/2018 |

\* cited by examiner

CONTENT PUSH METHOD AND DEVICE, APPARATUS, AND MEDIUM

CROSS-REFERENCE TO RELATED APPLICATIONS

This application is a continuation application of PCT Patent Application No. PCT/CN2023/114348, entitled "CONTENT PUSH METHOD AND DEVICE, APPARATUS, AND MEDIUM" filed on Aug. 23, 2023, which claims priority to Chinese Patent Application No. 2022110771109, entitled "CONTENT PUSH METHOD AND DEVICE, APPARATUS, AND MEDIUM" filed with the China National Intellectual Property Administration on Sep. 5, 2022, all of which is incorporated by reference in its entirety.

FIELD OF THE TECHNOLOGY

This application relates to artificial intelligence technologies and to the field of information processing technologies, and in particular, to a content push method and apparatus, a device, and a medium.

BACKGROUND OF THE DISCLOSURE

As information technologies develop, in existing services, content sorting needs to be performed first, and then corresponding service processing is performed based on a result of the sorting. For example, in an advertisement push scenario, a large quantity of advertisements that meet a push requirement need to be sorted first, and then an advertisement to be finally pushed to a user is determined based on a result of the sorting.

In the related art, a virtual resource input amount of each piece of content pushed as agreed is estimated in an offline state, and a resource input amount of a content pushed based on the resource input amount is obtained in the offline state. When a request arrives, content to be pushed as agreed and content to be pushed based on a resource input amount are uniformly sorted based on a virtual resource input amount of the content to be pushed as agreed and the resource input amount of the content to be pushed based on the resource input amount. However, in a push scenario, if content is directly selected from the content to be pushed as agreed and the content to be pushed based on the resource input amount, based on the estimated virtual resource input amount and the resource input amount of the content to be pushed based on the resource input amount for push when a request arrives, inaccurate content may be pushed, resulting in low content push accuracy and a waste of hardware resources that support a push function.

SUMMARY

In view of the foregoing technical problem, a content push method and apparatus, a device, and a medium need to be provided.

According to a first aspect, this application provides a content push method performed by a computer device, and the method includes:

determining candidate mixed content in response to a content push request, the mixed content comprising first-type content and second-type content, the first-type content being content to be pushed based on a dynamic resource input amount and the second-type content including multiple pieces of content to be pushed as agreed;

determining dynamic resource input information of the first-type content;

determining an overall content feature based on content features of the pieces of second-type content;

determining a first priority push probability of the first-type content based on object attribute information of an object that initiates the content push request, the overall content feature, and the dynamic resource input information;

determining second priority push probabilities respectively corresponding to the pieces of second-type content based on the object attribute information, the dynamic resource input information, and a priority push relationship between the content features of the pieces of second-type contents; and selecting content from the mixed content for push to the object that initiates the content push request based on the first priority push probability and the second priority push probabilities.

According to a second aspect, this application provides a computer device, including a memory and one or more processors. The memory has computer-readable instructions stored therein. The one or more processors, when executing the computer-readable instructions, causes the computer device to implement the steps in the method embodiments of this application.

According to a third aspect, this application provides one or more non-transitory computer-readable storage media, having computer-readable instructions stored therein. The computer-readable instructions, when executed by one or more processors, cause the computer device to implement the steps in the method embodiments of this application.

Details of one or more embodiments of this application are provided in the following drawings and description. Other features, objectives, and advantages of this application become apparent from the description, the drawings, and the claims.

BRIEF DESCRIPTION OF THE DRAWINGS

To describe technical solutions of embodiments of this application more clearly, drawings required for describing the embodiments are briefly described below. Apparently, the drawings in the following description show only some embodiments of this application, and a person of ordinary skill in the art can derive other drawings from the drawings without creative efforts.

DESCRIPTION OF EMBODIMENTS

To make objectives, technical solutions, and advantages of this application clearer, this application is further described in detail below with reference to drawings and embodiments. It is to be understood that, the specific embodiments described herein are merely used for explaining this application, and are not used for limiting this application.

Figure 1:
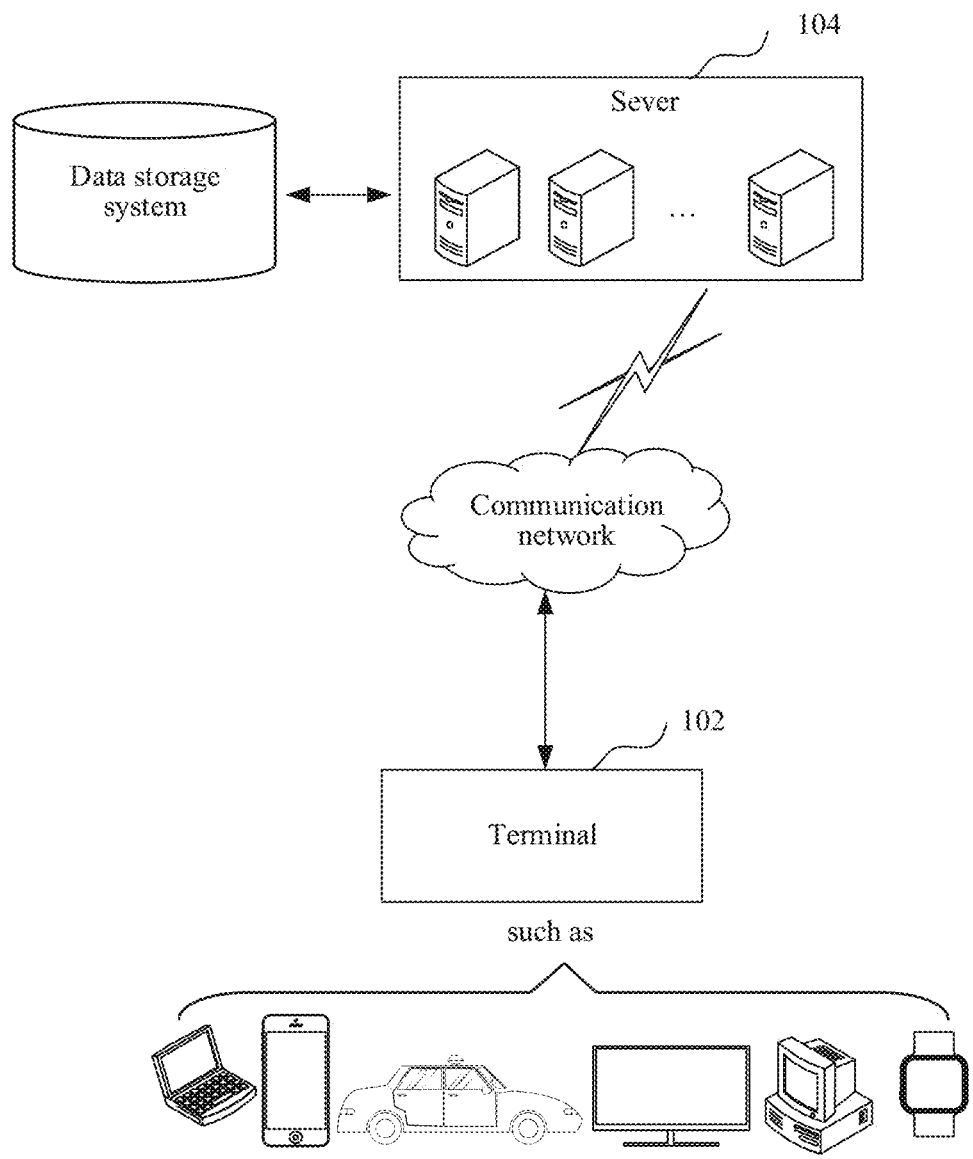
FIG. 1 is a diagram of an application environment of a content push method according to an embodiment.

A content push method provided in this application may be applied to an application environment shown in FIG. 1. A terminal 102 communicates with a server 104 through a network. A data storage system can store data to be processed by the server 104. The data storage system may be integrated on the server 104, or may be arranged on the cloud or another server. The terminal 102 may be, but is not limited to, various desktop computers, laptops, smart phones, tablet computers, Internet of Things devices, and portable wearable devices. The Internet of Thing devices may be a smart speaker, a smart television, a smart air conditioner, a smart on-board device, and the like. The portable wearable devices may be a smartwatch, a smart bracelet, a headset, or the like. The server 104 may be an independent physical server, a server cluster formed by a plurality of physical servers, a distributed system, or a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal 102 and the server 104 may be directly or indirectly connected through wired or wireless communication, which is not limited in this application.

The server 104 can determine candidate mixed content in response to a content push request, the mixed content including first-type content and second-type content, the first-type content being content to be pushed based on a dynamic resource input amount, the dynamic resource input amount being a dynamically changing resource input amount provided by at least one content provider, and the second-type content being content to be pushed as agreed. The server 104 can obtain dynamic resource input information of the first-type content, and obtain object attribute information of an object that initiates the content push request. The server 104 can determine a content feature of the second-type content, and determine an overall content feature based on content features of all pieces of second-type content. The server 104 can determine a dynamic resource input feature based on the dynamic resource input information. The server 104 can determine a first priority push probability of the first-type content based on the object attribute information, the overall content feature, and the dynamic resource input feature. The server 104 can analyze a priority push relationship between the content features of all pieces of second-type content, to obtain an internal priority push feature, and perform inter-type priority push relationship analysis based on the object attribute information, the internal priority push feature, and the dynamic resource input feature, to determine second priority push probabilities respectively corresponding to all pieces of second-type content. The server 104 can select content from the mixed content for push based on the first priority push probability and the second priority push probabilities.

The content push method in some embodiments of this application uses the artificial intelligence technology. For example, the content feature of the second-type content is a feature encoded by using the artificial intelligence technology, and the first priority push probability of the first-type content and the second priority push probabilities of the second-type content are probabilities predicted by using the artificial intelligence technology.

Figure 2:
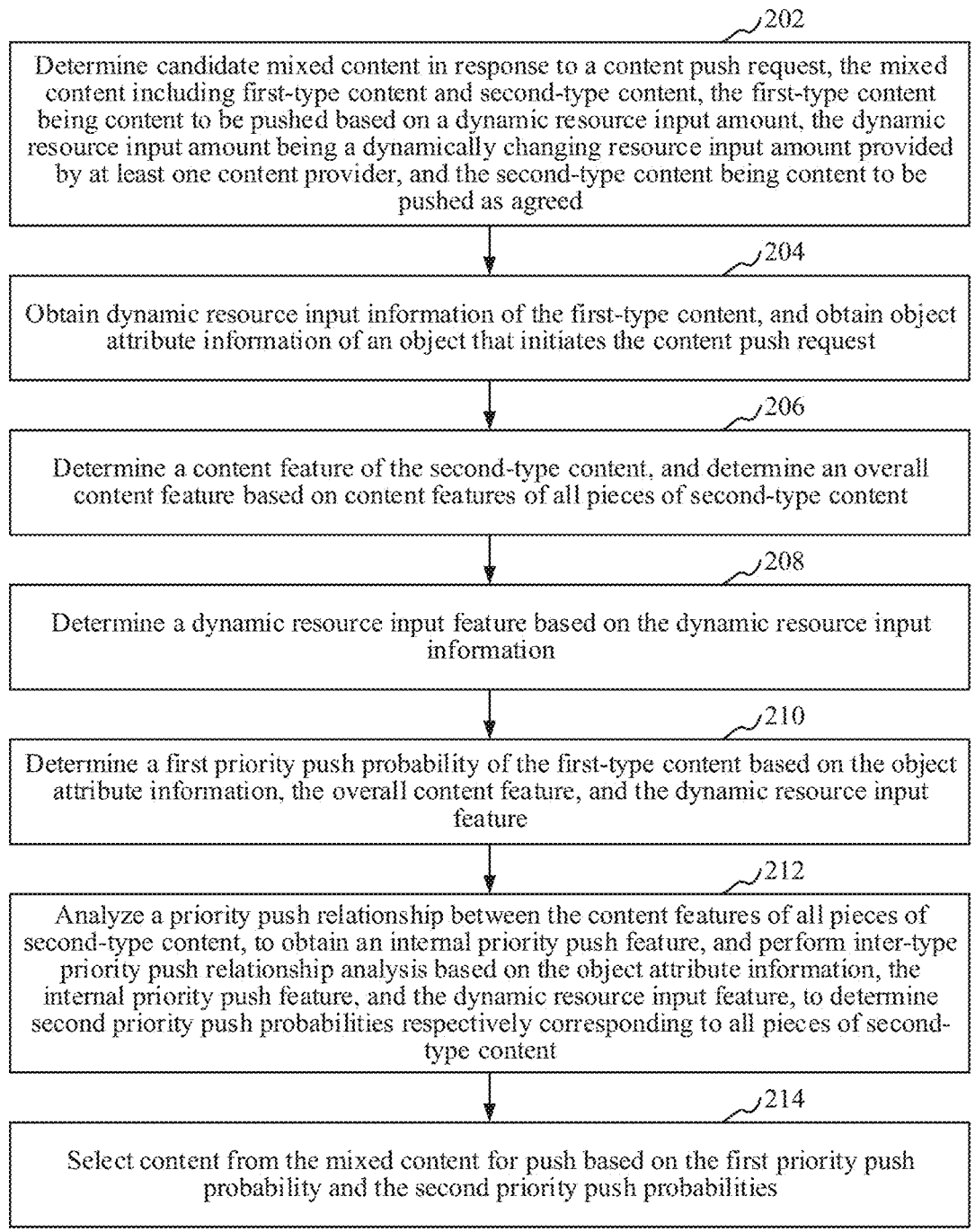
FIG. 2 is a schematic flowchart of a content push method according to an embodiment.

In an embodiment, as shown in FIG. 2, a content push method is provided. This embodiment is described by using an example in which the method is applied to the server 104 in FIG. 1. The method includes the following steps:

Step 202: Determine candidate mixed content in response to a content push request, the mixed content including first-type content and second-type content, the first-type content being content to be pushed based on a dynamic resource input amount, the dynamic resource input amount being a dynamically changing resource input amount provided by at least one content provider, and the second-type content being content to be pushed as agreed.

The content push request may be transmitted by a terminal in which an object logs to the server. The object may be a user or any subject other than the user. The content push request is an instruction that requests content push. Content is media content that needs to be pushed. For example, the content may be an advertisement that needs to be pushed. It may be understood that, the content further includes at least one of articles, videos, and images. The mixed content includes at least two types of content. For example, the mixed content includes the first-type content and the second-type content. The first-type content is content to be pushed based on the dynamic resource input amount. The dynamic resource input amount is a dynamically changing resource input amount provided by at least one content provider. The resource input amount is an amount of resources provided by the content provider to request a content push opportunity. When there are resource input amounts from a plurality of content providers, a higher resource input amount brings a higher probability of successfully requesting a content push opportunity. The expression "dynamically changing" means that an amount of resources inputted by a same content provider may change over time. It may be understood that, the amount of resources inputted by the same content provider is not fixed. The second-type content is content to be pushed as agreed. An agreement is a protocol reached between the content provider and a content push party regarding a content push opportunity. The expression "as agreed" means that the content push party needs to perform content push according to the protocol reached with the content provider.

Specifically, the object may perform a trigger operation on the terminal, so that the terminal corresponding to the object generates the content push request and transmits the content push request to the server. The server can determine the candidate mixed content from a database configured to store mixed content in response to the content push request transmitted by the terminal corresponding to the object.

In an embodiment, the content push request is an advertisement push request, and the mixed content is a mixed advertisement, the mixed advertisement including a first-type advertisement and a second-type advertisement, the first-type advertisement being an advertisement to be pushed based on a bid of an advertisement provider, and the second-type advertisement being an advertisement to be pushed as agreed with the advertisement provider. This embodiment can improve accuracy of advertisement push, thereby avoiding a waste of hardware resources that support an advertisement push function.

For example, the object may be a user, and the content push request may be an advertisement push request. The user opens a video application on the terminal and click/taps a video displayed in the video application. In this case, the terminal used by the user can generate an advertisement push request and transmit the advertisement push request to the server. The server can determine a candidate mixed advertisement in response to the advertisement push request transmitted by the terminal corresponding to the object.

In an embodiment, the server selects partial content matching the content push request from the database configured to store mixed content as the candidate mixed content in response to the content push request transmitted by the terminal corresponding to the object. It may be understood that, selecting the content matching the content push request means querying the database for content including object attribute information of the object. The object attribute information is attribute information of the object, which includes at least one of inherent attribute information of the object and behavioral attribute information of the object. The inherent attribute information of the object is intrinsic attribute information of the object. The behavioral attribute information of the object is attribute information generated after the object performs a specific behavior. The behavioral attribute information of the object includes at least one of device information of the terminal corresponding to the object, a network type, and the like.

In an embodiment, the server can determine content in the database configured to store mixed content as the candidate mixed content in response to the content push request transmitted by the terminal corresponding to the object.

Step 204: Obtain dynamic resource input information of the first-type content, and obtain object attribute information of an object that initiates the content push request.

The dynamic resource input information is information that represents an amount of resources dynamically inputted by the content provider of the first-type content. The information is used for requesting an opportunity for pushing the first-type content. It may be understood that the dynamic resource input information can dynamically change with the dynamic resource input amount.

To further understand the dynamic resource input information, an example is provided. If to-be-pushed content is an advertisement that needs to be pushed, the dynamic resource input information may be specifically a bid of the advertisement provider for obtaining the push opportunity. Specifically, the advertisement provider can estimate a revenue after the advertisement push, to provide a final bid based on the revenue and a budget.

In an embodiment, the server has the dynamic resource input information of the first-type content stored in the database. The server can directly obtain the dynamic resource input information of the first-type content from the database. The server can perform feature encoding on the object attribute information of the object that initiates the content push request, to obtain an object attribute feature corresponding to the object attribute information.

In an embodiment, the server can input the object attribute information into a feature encoding network of a pre-trained content sorting model, to perform feature encoding on the object attribute information through the feature encoding network, so as to obtain the object attribute feature corresponding to the object attribute information.

In an embodiment, the server has the dynamic resource input information of the first-type content stored in the database. The server can directly obtain the dynamic resource input information of the first-type content from the database.

Figure 3:
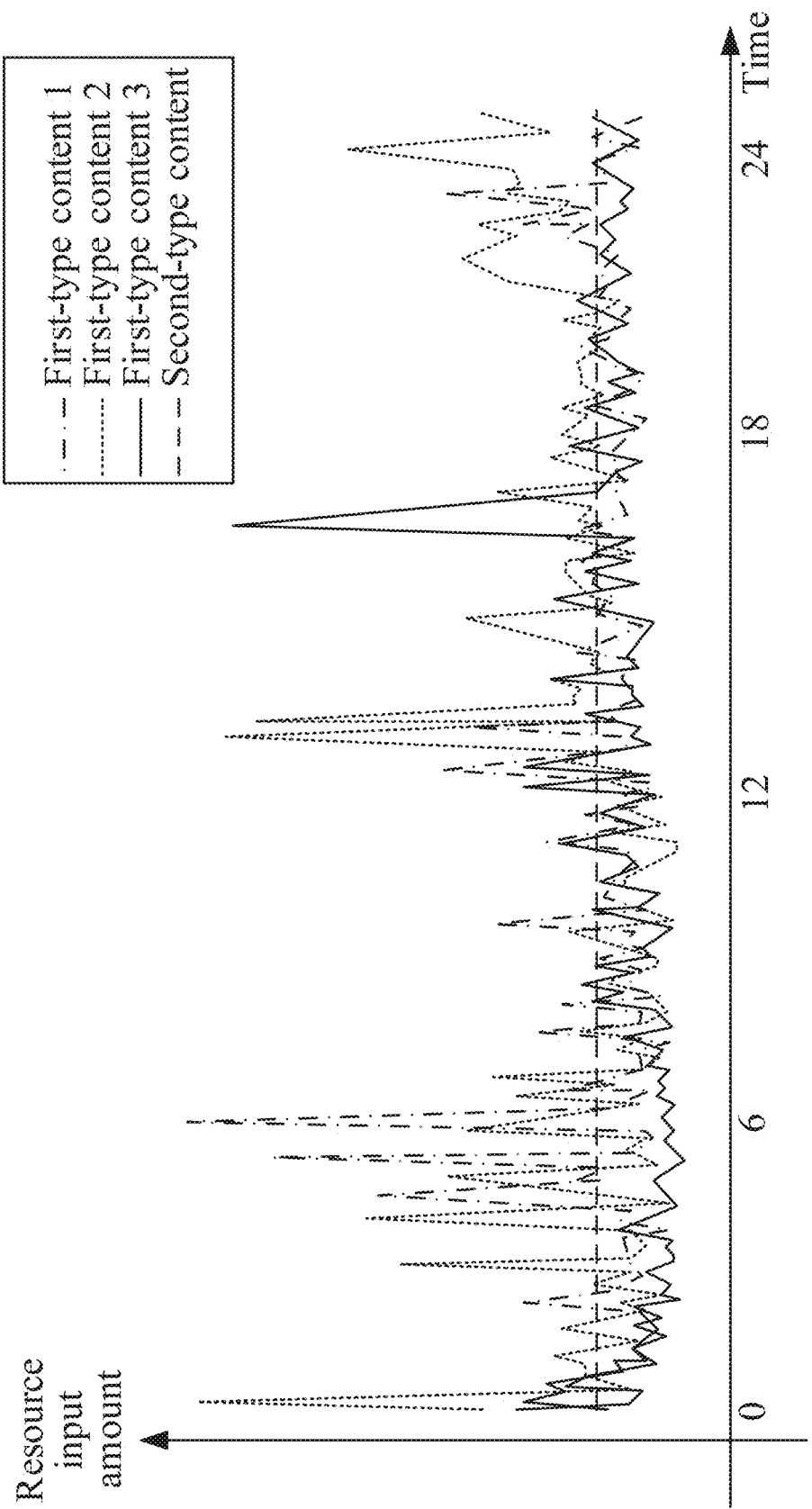
FIG. 3 is a schematic diagram of fluctuations in resource input amounts respectively corresponding to a first-type content and a second-type content according to an embodiment.

It may be understood that, the dynamic resource input information of the first-type content can dynamically change over time, and a resource input amount corresponding to the second-type content is substantially fixed and does not change over time. Referring to FIG. 3, the dynamic resource input information of first-type content 1, first-type content 2, and first-type content 3 shows significant fluctuations within 24 hours, while the resource input amount corresponding to the second-type content substantially remains unchanged within 24 hours.

Step 206: Determine a content feature of the second-type content, and determine an overall content feature based on content features of all pieces of second-type content.

The content feature is extracted from agreed information of the second-type content. The agreed information is protocol information reached between the content provider and the content push party regarding the content push opportunity. The agreed information of the second-type content may include at least one of an agreed quantity of pushes, an agreed push time, an agreed quantity of content click/taps, and the like. The overall content feature is a feature representing an overall priority push relationship of the second-type content compared to the first-type content.

In an embodiment, the server has the agreed information of the second-type content stored in the database. The server can directly obtain the agreed information of the second-type content from the database. In this way, the server can perform feature encoding on the agreed information of the second-type content, to obtain the content feature of the second-type content.

In an embodiment, the server can input the agreed information of the second-type content into the feature encoding network of the pre-trained content sorting model, to perform feature encoding on the agreed information of the second-type content through the feature encoding network, so as to obtain the content feature of the second-type content.

In an embodiment, the server has the content feature of the second-type content stored in the database. The server can directly obtain the content feature of the second-type content from the database.

In an embodiment, the server can splice the content features respectively corresponding to all pieces of second-type content, and use the spliced feature as the overall content feature.

Step 208: Determine a dynamic resource input feature based on the dynamic resource input information.

Specifically, the server can perform feature encoding on the dynamic resource input information, to obtain the dynamic resource input feature corresponding to the dynamic resource input information. It may be understood that, the dynamic resource input feature is a feature extracted from the dynamic resource input information.

In an embodiment, the server can input the dynamic resource input information into the feature encoding network of the pre-trained content sorting model, to perform feature encoding on the dynamic resource input information through the feature encoding network, so as to obtain the dynamic resource input feature.

Step 210: Determine a first priority push probability of the first-type content based on the object attribute information, the overall content feature, and the dynamic resource input feature.

The first priority push probability represents a probability that the first-type content is selected from the candidate mixed content for content push. It may be understood that, a larger first priority push probability of the first-type content indicates a larger probability that the first-type content is selected for push. On the contrary, a smaller first priority push probability of the first-type content indicates a smaller probability that the first-type content is selected for push.

Specifically, the server can determine the first priority push probability of the first-type content based on the object attribute feature, the overall content feature, and the dynamic resource input feature corresponding to the dynamic resource input information that are previously obtained.

In an embodiment, the server can perform feature splicing on the object attribute feature, the overall content feature, and the dynamic resource input feature corresponding to the dynamic resource input information, and determine the first priority push probability of the first-type content based on the spliced feature.

Step 212: Analyze a priority push relationship between the content features of all pieces of second-type content, to obtain an internal priority push feature, and perform inter-type priority push relationship analysis based on the object attribute information, the internal priority push feature, and the dynamic resource input feature, to determine second priority push probabilities respectively corresponding to all pieces of second-type content.

The priority push relationship is a priority order for content push. It may be understood that, the priority push relationship between the content features of all pieces of second-type content is a selection priority order for selecting content from all pieces of second-type content for push. Content with a higher priority is preferentially selected as to-be-pushed content. The internal of the internal priority push feature means being within scope of the second-type content. The internal priority push feature is a feature representing the priority push relationship between all pieces of second-type content. Each piece of second-type content corresponds to a second priority push probability. The second priority push probability represents a probability that the second-type content is selected from the candidate mixed content for content push. For each piece of second-type content, a larger second priority push probability of the second-type content indicates a larger probability that the second-type content is selected for push. On the contrary, a smaller second priority push probability of the second-type content indicates a smaller probability that the second-type content is selected for push.

In an embodiment, the server can perform internal priority push relationship analysis based on the content features of all pieces of second-type content, to obtain fusion weights respectively corresponding to the content features of all pieces of second-type content. In this way, the server can fuse the content features of all pieces of second-type content based on the fusion weights respectively corresponding to the content features of all pieces of second-type content, and use a fused feature as the internal priority push feature.

In an embodiment, the server can perform feature encoding on the object attribute information, to obtain the object attribute feature corresponding to the object attribute information. The server can perform feature encoding on the dynamic resource input information, to obtain the dynamic resource input feature corresponding to the dynamic resource input information. Further, the server can perform inter-type priority push relationship analysis based on the object attribute feature, the internal priority push feature, and the dynamic resource input feature corresponding to the dynamic resource input information, to determine the second priority push probabilities corresponding to all pieces of second-type content.

In an embodiment, the server can perform feature splicing on the object attribute feature, the internal priority push feature, and the dynamic resource input feature corresponding to the dynamic resource input information, and determine the second priority push probabilities corresponding to all pieces of second-type content based on the spliced feature and the first priority push probability of the first-type content.

Step 214: Select content from the mixed content for push based on the first priority push probability and the second priority push probabilities.

In an embodiment, the server can perform mixed sorting on the first-type content and the second-type content in the mixed content based on first priority push probabilities respectively corresponding to all pieces of first-type content and the second priority push probabilities respectively corresponding to all pieces of second-type content, to obtain a sorting result. The server can select a target content from the candidate mixed content based on the sorting result and push the target content to the terminal. The terminal can receive target content pushed by the server and display the target content on a display interface of the terminal. It may be understood that, after the target content is triggered in the terminal, the target content can be played and displayed on the display interface of the terminal.

In an embodiment, the selecting content from the mixed content for push based on the first priority push probability and the second priority push probabilities includes: performing mixed sorting on the first-type content and the second-type content in the mixed content based on a magnitude relationship between the first priority push probability and the second priority push probabilities, to obtain a mixed sorting queue; and selecting the content from the mixed content for push based on the mixed sorting queue.

Specifically, the sorting result includes the mixed sorting queue, and the mixed sorting queue includes the first-type content and the second-type content that are sorted. The server can perform mixed sorting on the first-type content and the second-type content in the mixed content based on the magnitude relationship between the first priority push probabilities respectively corresponding to all pieces of first-type content and the second priority push probabilities respectively corresponding to all pieces of second-type content, to obtain the mixed sorting queue. The server can select the target content from the candidate mixed content based on the mixed sorting queue and push the target content to the terminal. For example, the server can select content sorted first in the mixed sorting queue and corresponding to a highest priority push probability as the target content, and push the target content to the terminal.

In the foregoing embodiment, through mixed sorting of the first-type content and the second-type content in the mixed content, different types of content can be compared and sorted across types, so that more suitable content can be selected for recommendation, which can improve content push accuracy and avoid a waste of hardware resources that support a push function.

In the foregoing content push method, the candidate mixed content is determined in response to the content push request, the mixed content including the first-type content and the second-type content, the first-type content being content to be pushed based on the dynamic resource input amount, and the second-type content being content to be pushed as agreed; the dynamic resource input information of the first-type content and the content feature of the second-type content are determined, and the overall content feature is determined based on the content features of all pieces of second-type content; the first priority push probability of the first-type content is determined based on the object attribute information, the overall content feature, and the dynamic resource input feature corresponding to the dynamic resource input information; and the priority push relationship between the content features of all pieces of second-type content is analyzed, to obtain the internal priority push feature, and the inter-type priority push relationship analysis is performed based on the object attribute information, the internal priority push feature, and the dynamic resource input feature, to determine the second priority push probabilities corresponding to all pieces of second-type content. During the calculation of the first priority push probability and the second priority push probabilities, the object attribute information corresponding to the content push request, as well as the real-time dynamic resource input information of the first-type content and the content feature of the second-type content are considered. Therefore, the first priority push probability and the second priority push probabilities are data calculated for the request level. Further, at least partial content is selected from the mixed content for push based on the first priority push probability and the second priority push probabilities, which can improve the content push accuracy and avoid a waste of hardware resources that support a push function.

In addition, since a conventional content push method has low content push accuracy, while inaccurate push leads to a waste of system resources, the conventional content push method may lead to a waste of system resources. For example, pushing an inaccurate content requires system resources for push, resulting in a waste of system resources. For another example, pushing an inaccurate content further leads to unnecessary content presentation, causing unnecessary system interaction and a waste of display resources. However, the content push method of this application can improve the content push accuracy, thereby saving system resources.

In an embodiment, the analyzing a priority push relationship between the content features of all pieces of second-type content, to obtain an internal priority push feature includes: determining, for each piece of second-type content based on the content feature of the second-type content and the content feature of remaining content, a threat coefficient of the remaining content to the second-type content, the remaining content being second-type content in all pieces of second-type content other than the second-type content; and performing weight fusion on the content features respectively corresponding to all pieces of second-type content based on the threat coefficients respectively corresponding to all pieces of second-type content, to obtain the internal priority push feature.

The threat coefficient is a coefficient representing a degree of threat. It may be understood that, a larger threat coefficient of the remaining content to the second-type content indicates a larger degree of threat of the remaining content to the second-type content and indicates a smaller probability that the second-type content receives a priority push opportunity.

Specifically, for each piece of second-type content, the server can use second-type content in all pieces of second-type content other than the second-type content as the remaining content. The server can determine the threat coefficient of the remaining content to the second-type content based on the content feature corresponding to the second-type content and the content feature corresponding to the remaining content. The server can determine the fusion weights of the content features corresponding to all pieces of second-type content based on the threat coefficients respectively corresponding to all pieces of second-type content. The server can fuse the content features of all pieces of second-type content based on the fusion weights respectively corresponding to the content features of all pieces of second-type content, and use a fused feature as the internal priority push feature.

It may be understood that, for each piece of second-type content, the server can use the threat coefficient of the remaining content to the second-type content as the fusion weight of the content feature corresponding to the remaining content. In this way, the server can determine the fusion weight of the content feature corresponding to the second-type content based on the fusion weight of the content feature corresponding to the remaining content. It may be understood that, a sum of the fusion weight of the content feature corresponding to the remaining content and the fusion weight of the content feature corresponding to the second-type content is equal to 1.

In the foregoing embodiment, the weight fusion is performed on the content features respectively corresponding to all pieces of second-type content based on the threat coefficients respectively corresponding to all pieces of second-type content, which can obtain a more accurate internal priority push feature, thereby further improving accuracy of calculating the second priority push probabilities and further avoiding a waste of hardware resources that support a push function.

Figure 4:
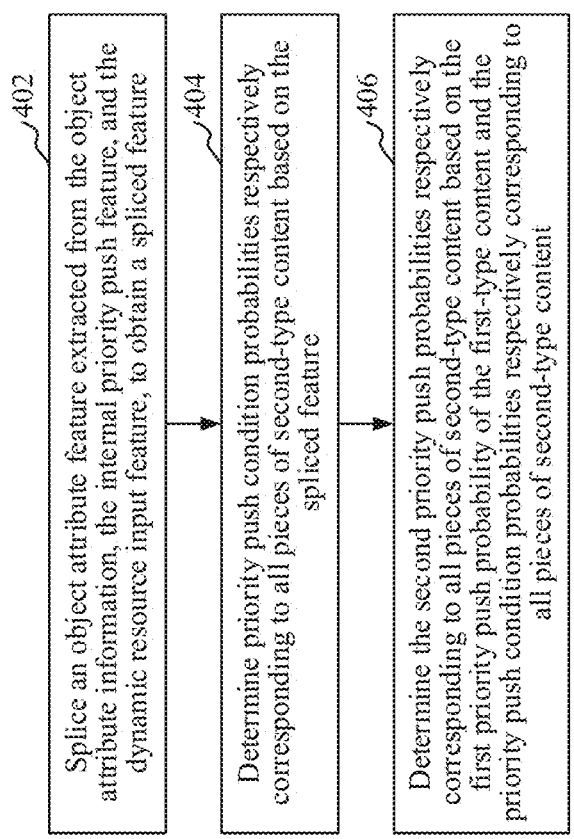
FIG. 4 is a schematic diagram of a process of calculating a second priority push probability according to an embodiment.

In an embodiment, as shown in FIG. 4, the performing inter-type priority push relationship analysis based on the object attribute information, the internal priority push feature, and the dynamic resource input feature, to determine second priority push probabilities respectively corresponding to all pieces of second-type content includes the following steps:

Step 402: Splice an object attribute feature extracted from the object attribute information, the internal priority push feature, and the dynamic resource input feature, to obtain a spliced feature.

Step 404: Determine priority push condition probabilities respectively corresponding to all pieces of second-type content based on the spliced feature.

Step 406: Determine the second priority push probabilities respectively corresponding to all pieces of second-type content based on the first priority push probability of the first-type content and the priority push condition probabilities respectively corresponding to all pieces of second-type content.

The spliced feature is a feature obtained by splicing the object attribute feature corresponding to the object attribute information, the internal priority push feature, and the dynamic resource input feature corresponding to the dynamic resource input information. The priority push condition probabilities are condition probabilities respectively corresponding to all pieces of second-type content in the mixed content under a precondition that all pieces of second-type content have a priority push opportunity (that is, the second priority push probabilities respectively corresponding to all pieces of second-type content are all greater than the first priority push probability corresponding to the first-type content).

Specifically, the server can splice the object attribute feature extracted from the object attribute information, the internal priority push feature, and the dynamic resource input feature corresponding to the dynamic resource input information, to obtain the spliced feature. The server can determine the priority push condition probabilities respectively corresponding to all pieces of second-type content based on the spliced feature. In this way, the server can determine the second priority push probabilities corresponding to all pieces of second-type content based on the first priority push probability of the first-type content and the priority push condition probabilities respectively corresponding to all pieces of second-type content.

In an embodiment, the server can input the spliced feature into a second probability prediction network of the pre-trained content sorting model, to determine the priority push condition probabilities respectively corresponding to all pieces of second-type content through the second probability prediction network.

In the foregoing embodiment, based on the first priority push probability of the first-type content and the priority push condition probabilities respectively corresponding to all pieces of second-type content, the second priority push probabilities respectively corresponding to all pieces of second-type content can be more accurately determined, thereby further improving the accuracy of calculating the second priority push probabilities and further avoiding a waste of hardware resources that support a push function.

In an embodiment, the determining a first priority push probability of the first-type content based on the object attribute information, the overall content feature, and the dynamic resource input feature includes: inputting the object attribute feature of the object attribute information, the overall content feature, and the dynamic resource input feature into a first probability prediction network in a pre-trained content sorting model, to determine the first priority push probability of the first-type content through the first probability prediction network. The determining priority push condition probabilities respectively corresponding to all pieces of second-type content based on the spliced feature includes: inputting the spliced feature into a second probability prediction network of the pre-trained content sorting model, to determine the priority push condition probabilities respectively corresponding to all pieces of second-type content through the second probability prediction network.

The content sorting model is a neural network model used for mixed sorting of the first-type content and the second-type content in the mixed content. The first probability prediction network is a neural network configured to predict the first priority push probability of the first-type content. The second probability prediction network is a neural network configured to predict the second priority push probability of the second-type content.

Specifically, the content sorting model includes the first probability prediction network and the second probability prediction network. The server can splice the object attribute feature corresponding to the object attribute information, the overall content feature, and the dynamic resource input feature corresponding to the dynamic resource input information, and input the spliced feature into the first probability prediction network in the pre-trained content sorting model, to determine the first priority push probability corresponding to the first-type content through the first probability prediction network. The server can splice the object attribute feature extracted from the object attribute information, the internal priority push feature, and the dynamic resource input feature corresponding to the dynamic resource input information, to obtain the spliced feature, and input the spliced feature into the second probability prediction network of the pre-trained content sorting model, to determine the priority push condition probabilities respectively corresponding to all pieces of second-type content through the second probability prediction network.

In the foregoing embodiment, by determining the first priority push probability of the first-type content through the first probability prediction network in the content sorting model, accuracy of calculating the first priority push probability can be improved. By determining the priority push condition probabilities respectively corresponding to all pieces of second-type content through the second probability prediction network in the content sorting model, accuracy of calculating the priority push condition probabilities can be improved, thereby improving the accuracy of calculating the second priority push probabilities and further avoiding a waste of hardware resources that support a push function.

In an embodiment, the determining the second priority push probabilities respectively corresponding to all pieces of second-type content based on the first priority push probability of the first-type content and the priority push condition probabilities respectively corresponding to all pieces of second-type content includes: determining a relative priority push probability of the second-type content compared to the first-type content based on the first priority push probability of the first-type content; and determining the second priority push probabilities respectively corresponding to all pieces of second-type content based on the relative priority push probability and the priority push condition probabilities respectively corresponding to all pieces of second-type content.

The relative priority push probability is a priority push probability of the second-type content compared to the first-type content.

Specifically, the server can determine the relative priority push probability of the second-type content compared to the first-type content based on the first priority push probability of the first-type content, and determine the second priority push probabilities corresponding to all pieces of second-type content based on the relative priority push probability and the priority push condition probabilities corresponding to all pieces of second-type content.

In an embodiment, for each piece of second-type content, the server can use a product of the relative priority push probability and the priority push condition probability corresponding to the second-type content as the second priority push probability corresponding to the second-type content.

In an embodiment, for each piece of second-type content, the second priority push probability corresponding to the second-type content may be calculated by using the following full probability formula:

$$p(GD_j) = p(GD_j|GD) \times (1 - p(RTB))$$

RTB indicates the first-type content, GD indicates the second-type content, $p(GD_j|GD)$ indicates a priority push condition probability corresponding to $j^{th}$ second-type content, $p(RTB)$ indicates a first priority push probability of the first-type content, $(1-p(RTB))$ indicates a relative priority push probability of the $j^{th}$ second-type content compared to the first-type content, and $p(GD_j)$ indicates a second priority push probability corresponding to the $j^{th}$ second-type content.

In the foregoing embodiment, the second priority push probabilities corresponding to all pieces of second-type content are determined based on the relative priority push probability and the priority push condition probabilities corresponding to all pieces of second-type content, which can further improve the accuracy of calculating the second priority push probabilities and further avoid a waste of hardware resources that support a push function.

In an embodiment, the to-be-pushed content is selected based on a sorting result obtained by the pre-trained content sorting model by sorting the mixed content, the sorting of the mixed content is performed by the content sorting model based on the first priority push probability and the second priority push probabilities, and the method further includes a step of training the content sorting model. The step of training the content sorting model includes: obtaining at least one piece of sample data, the sample data including first-type sample content, second-type sample content, a first sorting label, sample object attribute information, dynamic sample resource input information, and a sample content feature, the sample object attribute information belonging to a sample object that historically initiates a sample content push request, the sample content feature belonging to the second-type sample content, the sample content push request being used for recalling the first-type sample content and the second-type sample content, the first-type sample content being content to be pushed based on the dynamic resource input amount, and the second-type sample content being content to be pushed as agreed; inputting the sample data into a to-be-trained content sorting model to obtain first prediction result data; and iteratively training the to-be-trained content sorting model based on a difference between the first prediction result data and the first sorting label until an iteration stop condition is met, to obtain a trained content sorting model.

The sample data is training data used for training the content sorting model. The first-type sample content is first-type content used for training the content sorting model. The second-type sample content is second-type content used for training the content sorting model. The first sorting label is a reference label data annotated for the first-type sample content and the second-type sample content. The sample object is an object used for training the content sorting model. The sample object attribute information is attribute information of the sample object. The dynamic sample resource input information is dynamic resource input information of the sample object. The sample content feature is a content feature of the second-type sample content. The first prediction result data is result data predicted and outputted by the to-be-trained content sorting model.

Specifically, the server can obtain at least one piece of sample data. The sample data includes the first-type sample content, the second-type sample content, and the first sorting label for the first-type sample content and the second-type sample content. In addition, the sample data further includes the sample object attribute information of the sample object corresponding to the sample data, the dynamic sample resource input information of the first-type sample content, and the sample content feature of the second-type sample content. In an embodiment, the server can perform feature encoding on the sample object attribute information, to obtain the sample object attribute feature corresponding to the sample object attribute information. The server can perform feature encoding on the dynamic sample resource input information, to obtain the dynamic sample resource input feature corresponding to the dynamic sample resource input information. In this way, the server can splice the sample object attribute feature, the dynamic sample resource input feature, and the sample content feature, and input the spliced feature into the to-be-trained content sorting model, to obtain the first prediction result data. The server can iteratively train the to-be-trained content sorting model based on the difference between the first prediction result data and the first sorting label until the iteration stop condition is met, to obtain the trained content sorting model.

In an embodiment, the iteration stop condition may be that a quantity of iterations reaches a preset iteration quantity or that the difference between the first prediction result data and the first sorting label is less than a preset difference value.

In an embodiment, the server can iteratively train the to-be-trained content sorting model based on the difference between the first prediction result data and the first sorting label, to obtain the trained content sorting model.

In the foregoing embodiment, the sample object attribute information, the dynamic sample resource input information, and sample content features are inputted into the to-be-trained content sorting model, to obtain the first prediction result data, and the to-be-trained content sorting model is iteratively trained with a goal of reducing the difference between the first prediction result data and the first sorting label, to obtain the trained content sorting model, which can improve sorting accuracy of the content sorting model that is finally obtained and further avoid a waste of hardware resources that support a push function.

In an embodiment, the obtaining at least one piece of sample data includes: obtaining sample object attribute information of at least one sample object, obtaining at least one piece of first-type sample content, obtaining dynamic sample resource input information of the first-type sample content, obtaining at least one piece of second-type sample content, and obtaining a sample content feature of the second-type sample content; determining a content push result corresponding to each sample content push request based on the sample object attribute information, the dynamic sample resource input information, and the sample content feature, the sample content push request being a request transmitted by a terminal corresponding to the sample object; labeling, for the content push result corresponding to each sample content push request based on the content push result corresponding to each sample content push request, first-type sample content and second-type sample content recalled by the sample content push request, to obtain the first sorting label.

The content push result represents the content push result corresponding to each sample content push request. For example, first-type sample content b and second-type sample content a1, a2, and a3 exist. For a sample content push request, the content push result corresponding to the sample content push request determined by the server is: push the second-type sample content a1 to the terminal, and do not push the first-type sample content b and the second-type sample content a2 and a3.

Specifically, the server can directly obtain the sample object attribute information of the at least one sample object and obtain the dynamic sample resource input information of the at least one piece of first-type sample content and the sample content feature of the at least one piece of second-type sample content from the database. The server can determine the content push result corresponding to each sample content push request based on the sample object attribute information, the dynamic sample resource input information, and the sample content feature. The server can label the first-type sample content and the second-type sample content based on the content push result, to obtain the first sorting label for the first-type sample content and the second-type sample content. The sample content push request is a request transmitted by the terminal corresponding to the sample object.

In an embodiment, the server can obtain a pre-built optimization equation, and solve the optimization equation based on sample object attribute information, the dynamic sample resource input information, and the sample content features, to obtain a solving result. The server can determine the content push result corresponding to each sample content push request based on the solving result.

In an embodiment, it is assumed that there are I exposures (that is, I sample content push requests) in total, i indicating an $i^{th}$ exposure, K sample objects, k indicating a $k^{th}$ sample object, J pieces of second-type sample content, and one piece of first-type sample content having a priority push opportunity. For each piece of second-type sample content j, $d_j$ exposures in a specific direction are reserved at a fixed unit price of $C_j$. If final assigned exposures are insufficient, a total amount $u_j$ of shortages are compensated at a unit price of $p_j^-$. In addition, since exposures assigned for excesses cannot be further charged, a unit price penalty of $p_j^+$ is introduced for an excess of $o_j$. A priority pusher of the first-type sample content provides a bid $b_i$ for the exposure i. It is assumed that $x_{ij} \in \{0,1\}$ indicates whether the exposure i is assigned to the second-type sample content j. A value of $x_{ij}$ being 0 indicates that the exposure i is not assigned to the second-type sample content j, and a value of $x_{ij}$ being 1 indicates that the exposure i is assigned to the second-type sample content j. Obviously, if $\Sigma_j x_{ij}=0$, the exposure i is assigned to the first-type sample content. $y_i=1-\Sigma_j x_{ij}$ is denoted as an indicator variable for the first-type sample content. A revenue of a content platform may be defined as $$\sum_{i,j} c_j x_{ij} + \sum_i b_i y_i - \sum_j (p_j^- u_j + p_j^+ o_j)$$

In addition to the revenue of the content platform, the content push service further needs to meet specific service requirements to ensure assignment quality. For example, the content push service needs to ensure at least one of the following: a same object will not see content of a same field, content of a same industry will not be pushed too many times, and the exposure assigned to the second-type sample content will ensure a specific quantity of clicks/taps. In comprehensive consideration of the revenue of the content platform and the service constraints, the optimization equation may be expressed as:

$$\text{Maximize} \sum_{i,j} c_j x_{ij} + \sum_i b_i y_i - \sum_j (p_j^- u_j + p_j^+ o_j)$$

$$\text{s.t. } \forall_i \sum_j x_{ij} + y_i = 1,$$

$$\forall_j \sum_i x_{ij} + u_j - o_j = d_j,$$

$$\forall_{j,k} \sum_{i \in \Gamma(j,k)} x_{ij} \leq f_{jk}^*,$$

$$\forall_{j,k} \sum_{i \in \Gamma(\Gamma(j),k)} x_{ij} \leq f_{\Gamma(j),k}^+,$$

-continued $$\forall_j \sum_i pCTR_{ij} * x_{ij} \geq \text{click}_j,$$

$$\forall_{i,j} x_{ij} \geq 0, y_i \geq 0, o_j \geq 0, u_j \geq 0$$

Maximize means maximizing the revenue of the platform, s.t. indicates the service constraints, $\forall$ indicates any, $\Gamma(j,k)$ indicates a quantity of times a sample object k sees the second-type sample content j, $\Gamma(\Gamma(j),k)$ indicates a quantity of times the sample object k sees a content of the same field as the second-type sample content j, $f_{jk}^*$ indicates a maximum quantity of times the sample object k can see the second-type sample content j, $f_{\Gamma(j),k}^+$ indicates a maximum quantity of times the sample object k can see the content of the same field as the second-type sample content j, $\text{click}_j$ indicates a desired quantity of clicks/taps for the second-type sample content j, and $pCTR_{ij}$ indicates a click/tap rate of the second-type sample content j under the exposure i predicted based on the foregoing sample data.

In the foregoing embodiment, by labeling the first-type sample content and the second-type sample content through the determined content push result, the first sorting label for the first-type sample content and the second-type sample content can be obtained, thereby transforming the content push problem into a supervised training way, which provides an effective way to achieve high-accuracy content push, and avoids a waste of hardware resources that support a push function.

In an embodiment, the iteratively training the to-be-trained content sorting model based on a difference between the first prediction result data and the first sorting label until an iteration stop condition is met, to obtain a trained content sorting model includes: determining a first distillation loss based on the difference between the first prediction result data and the first sorting label; iteratively training the to-be-trained content sorting model through the first distillation loss, to obtain an initial content sorting model; determining a second distillation loss based on a difference between first distillation result data and second distillation result data, the first distillation result data being result data outputted by the to-be-trained content sorting model, and the second distillation result data being result data outputted by the initial content sorting model; and performing distillation processing on the initial content sorting model based on the first distillation loss and the second distillation loss, to obtain the trained content sorting model.

The first distillation loss is determined based on the difference between the first prediction result data and the first sorting label. The initial content sorting model is an initial content sorting model obtained by iteratively training the to-be-trained content sorting model. The second distillation loss is determined based on a difference between the first distillation result data and the second distillation result data.

Specifically, the server can determine the first distillation loss based on the difference between the first prediction result data and the first sorting label, and iteratively train the to-be-trained content sorting model through the first distillation loss to obtain the initial content sorting model. The server can use result data outputted by the to-be-trained content sorting model as the first distillation result data, and use result data outputted by the initial content sorting model as the second distillation result data. The server can determine the second distillation loss based on the difference between the first distillation result data and the second distillation result data. In this way, the server can perform distillation processing on the initial content sorting model based on the first distillation loss and the second distillation loss, to obtain the trained content sorting model. It may be understood that, the pre-trained content sorting model has lower model complexity but a higher running speed than the initial content sorting model.

In the foregoing embodiment, the first distillation loss is a loss of the to-be-trained content sorting model, and the second distillation loss is a loss between the to-be-trained content sorting model and the initial content sorting model. Therefore, by performing distillation processing on the initial content sorting model based on the first distillation loss and the second distillation loss, generalization knowledge of the initial content sorting model can be retained as much as possible while training of the to-be-trained content sorting model is achieved, thereby further improving the sorting accuracy of the content sorting model that is finally obtained and further avoiding a waste of hardware resources that support a push function.

In an embodiment, the first distillation result data includes first target distillation result data and first intermediate distillation result data, and the second distillation result data includes second target distillation result data and second intermediate distillation result data. The determining a second distillation loss based on a difference between first distillation result data and second distillation result data includes: determining a target result distillation loss based on a difference between the first target distillation result data and the second target distillation result data; determining an intermediate result distillation loss based on a difference between the first intermediate distillation result data and the second intermediate distillation result data; and determining the second distillation loss based on the target result distillation loss and the intermediate result distillation loss.

The first target distillation result data is result data outputted by a last network layer in the to-be-trained content sorting model. The first intermediate distillation result data is result data outputted by each intermediate network layer in the to-be-trained content sorting model. The second target distillation result data is result data outputted by a last network layer in the initial content sorting model. The second intermediate distillation result data is result data outputted by each intermediate network layer in the initial content sorting model.

Specifically, the server can determine the target result distillation loss based on the difference between the first target distillation result data and the second target distillation result data. The server can determine the intermediate result distillation loss based on the difference between the first intermediate distillation result data and the second intermediate distillation result data. In this way, the server can determine the second distillation loss based on the target result distillation loss and the intermediate result distillation loss.

In an embodiment, the first intermediate distillation result data includes first single sample distillation result data and first multi-sample distillation result data. The second intermediate distillation result data includes second single sample distillation result data and second multi-sample distillation result data. The server can determine a single sample distillation loss based on a difference between the first single sample distillation result data and the second single sample distillation result data. The server can determine a multi-sample distillation loss based on a difference between the first multi-sample distillation result data and the second multi-sample distillation result data. In this way, the server can determine the intermediate result distillation loss based on the single sample distillation loss and the multi-sample distillation loss. The first single sample distillation result data is first intermediate distillation result data obtained for a single piece of sample data. The first multi-sample distillation result data is first intermediate distillation result data obtained for a plurality of pieces of sample data. The second single sample distillation result data is second intermediate distillation result data obtained for a single piece of sample data. The second multi-sample distillation result data is second intermediate distillation result data obtained for a plurality of pieces of sample data.

In an embodiment, the server can determine the target distillation loss based on the first distillation loss and the second distillation loss, and perform distillation processing on the initial content sorting model based on the target distillation loss to obtain the trained content sorting model.

In an embodiment, the target distillation loss may be calculated by using the following loss function:

$$L_{total} = L(\theta_{GD}^S, \theta_{RTB}^S) + \gamma_1 L_{logits}^S + \gamma_2 L_{hints}^S + \gamma_3 L_{sim}^S$$

$\theta_{GD}^S$ and $\theta_{RTB}^S$ indicate model parameters of the content sorting model, $\gamma_1$, $\gamma_2$, and $\gamma_3$ indicate the hyper-parameters of the content sorting model, $L(\theta_{GD}^S, \theta_{RTB}^S)$ indicates the first distillation loss, $L_{log\,its}^S$ indicates the target result distillation loss, $L_{h\,int\,s}^S$ indicates the single sample distillation loss, $L_{sim}^S$ indicates the multi-sample distillation loss, and $L_{total}$ indicates the target distillation loss.

In the foregoing embodiments, the target result distillation loss is a loss corresponding to a final result outputted by the model, and the intermediate result distillation loss is a loss corresponding to an intermediate result outputted by each network layer in the model. Therefore, by determining the second distillation loss based on the target result distillation loss and the intermediate result distillation loss, accuracy of the second distillation loss can be improved, thereby further improving the sorting accuracy of the content sorting model that is finally obtained and further avoiding a waste of hardware resources that support a push function.

In an embodiment, the to-be-pushed content is selected based on the sorting result obtained by the pre-trained content sorting model by sorting the mixed content, the sorting of the mixed content is performed by the content sorting model based on the first priority push probability and the second priority push probabilities, and the method further includes: obtaining, for each model update period, periodic sample data corresponding to the model update period, the periodic sample data including first-type calibration content, second-type calibration content, a second sorting label, calibration object attribute information, dynamic calibration resource input information, and a calibration content feature, the calibration object attribute information belonging to a calibration object that historically initiates a calibration content push request, the calibration content feature belonging to the second-type calibration content, the calibration content push request being used for recalling the first-type calibration content and the second-type calibration content, the first-type calibration content being content to be pushed based on the dynamic resource input amount, and the second-type calibration content being content to be pushed as agreed; inputting the periodic sample data into a content sorting model obtained by updating in a previous model update period, to obtain second prediction result data corresponding to a current model update period; determining a first calibration loss based on a difference between the second prediction result data and the second sorting label; determining a second calibration loss based on a difference between first calibration result data and second calibration result data, the first calibration result data being result data outputted by the content sorting model obtained by updating in the previous model update period, and the second calibration result data being result data outputted by a content sorting model obtained by updating in a preceding model update period, the preceding model update period being a model update period before the previous model update period; and updating the content sorting model obtained by updating in the previous model update period based on the first calibration loss and the second calibration loss.

The periodic sample data is training data used for training a content sorting model corresponding to a model update period. The first-type calibration content is first-type content used for calibrating the content sorting model. The second-type calibration content is second-type content used for calibrating the content sorting model. The second sorting label is reference data annotated for the first-type calibration content and the second-type calibration content. The calibration object is an object used for calibrating the content sorting model. The calibration object attribute information is attribute information of the calibration object. The dynamic calibration resource input information is dynamic resource input information of the calibration object. The calibration content feature is a content feature of the second-type calibration content. The second prediction result data is result data predicted and outputted by the content sorting model obtained by updating in the previous model update period. The first calibration loss is determined based on the difference between the second prediction result data and the second sorting label. The second calibration loss is determined based on the difference between the first calibration result data and the second calibration result data.

Specifically, since performance of the content sorting model that has been launched and used decreases over time, the server may regularly calibrate and update the content sorting model, to maintain stable performance of the content sorting model. For each model update period, the server can obtain the periodic sample data corresponding to the model update period. The periodic sample data includes the first-type calibration content, the second-type calibration content, and the second sorting label for the first-type calibration content and the second-type calibration content. The periodic sample data further includes the calibration object attribute information of the calibration object corresponding to the periodic sample data, the dynamic calibration resource input information of the first-type calibration content, and the calibration content feature of the second-type calibration content. The server can input the periodic sample data into the content sorting model obtained by updating in the previous model update period, obtain the second prediction result data corresponding to the current model update period, and determine the first calibration loss based on the difference between the second prediction result data and the second sorting label. The server can determine the second calibration loss based on the difference between the first calibration result data and the second calibration result data. In this way, the server can update the content sorting model obtained by updating in the previous model update period based on the first calibration loss and the second calibration loss.

In the foregoing embodiment, the first calibration loss is a loss of the content sorting model obtained by updating in the previous model update period, and the second calibration loss is a loss between the content sorting model obtained by updating in the previous model update period and the content sorting model obtained by updating in the preceding model update period. Therefore, by calibrating the initial content sorting model based on the first calibration loss and the second calibration loss, generalization knowledge of the content sorting model obtained by updating in the preceding model update period can be retained as much as possible while training of the content sorting model obtained by updating in the previous model update period is achieved, thereby further improving the sorting accuracy of the content sorting model that is finally obtained and further avoiding a waste of hardware resources that support a push function.

In an embodiment, the first calibration result data includes first target calibration result data and first intermediate calibration result data, and the second calibration result data includes second target calibration result data and second intermediate calibration result data. The determining a second calibration loss based on a difference between first calibration result data and second calibration result data includes: determining a target result calibration loss based on a difference between the first target calibration result data and the second target calibration result data; determining an intermediate result calibration loss based on a difference between the first intermediate calibration result data and the second intermediate calibration result data; and determining the second calibration loss based on the target result calibration loss and the intermediate result calibration loss.

The first target calibration result data is result data outputted by a last network layer in the content sorting model obtained by updating in the previous model update period. The first intermediate calibration result data is result data outputted by each intermediate network layer in the content sorting model obtained by updating in the previous model update period. The second target calibration result data is result data outputted by a last network layer in the content sorting model obtained by updating in the preceding model update period. The second intermediate calibration result data is result data outputted by each intermediate network layer in the content sorting model obtained by updating in the preceding model update period.

Specifically, the server can determine the target result calibration loss based on the difference between the first target calibration result data and the second target calibration result data. The server can determine the intermediate result calibration loss based on the difference between the first intermediate calibration result data and the second intermediate calibration result data. In this way, the server can determine the second calibration loss based on the target result calibration loss and the intermediate result calibration loss.

In an embodiment, the first intermediate calibration result data includes first single sample calibration result data and first multi-sample calibration result data. The second intermediate calibration result data includes second single sample calibration result data and second multi-sample calibration result data. The server can determine a single sample calibration loss based on a difference between the first single sample calibration result data and the second single sample calibration result data. The server can determine a multi-sample calibration loss based on a difference between the first multi-sample calibration result data and the second multi-sample calibration result data. In this way, the server can determine the intermediate result calibration loss based on the single sample calibration loss and the multi-sample calibration loss. The first single sample calibration result data is first intermediate calibration result data obtained for a single piece of sample data. The first multi-sample calibration result data is first intermediate calibration result data obtained for a plurality of pieces of sample data. The second single sample calibration result data is second intermediate calibration result data obtained for a single piece of sample data. The second multi-sample calibration result data is second intermediate calibration result data obtained for a plurality of pieces of sample data.

In an embodiment, the server can determine a target calibration loss based on the first calibration loss and the second calibration loss, and update the content sorting model obtained by updating in the previous model update period based on the target calibration loss.

In an embodiment, the target calibration loss may be calculated by using the following loss function:

$$L^C = L_f(\theta_{GD}^C, \theta_{RTB}^C) + \alpha_1 g_{logits}^C + \alpha_2 L_{hints}^C + \alpha_3 L_{sim}^C$$

$\theta_{GD}^C$, $\theta_{RTB}^C$ indicate model parameters of the content sorting model, $\alpha_1$, $\alpha_2$, and $\alpha_3$ indicate the hyper-parameters of the content sorting model, $L_f(\theta_{GD}^C, \theta_{RTB}^C)$ indicates the first calibration loss, $L_{log\ its}^C$ indicates the target result calibration loss, $L_{h\ int\ s}^C$ indicates the single sample calibration loss, $L_{sim}^C$ indicates the multi-sample calibration loss, and $L^C$ indicates the target calibration loss.

In the foregoing embodiments, the target result calibration loss is a loss corresponding to a final result outputted by the model, and the intermediate result calibration loss is a loss corresponding to an intermediate result outputted by each network layer in the model. Therefore, by determining the second calibration loss based on the target result calibration loss and the intermediate result calibration loss, accuracy of the second calibration loss can be improved, thereby further improving the sorting accuracy of the content sorting model that is finally obtained and further avoiding a waste of hardware resources that support a push function.

Figure 5:
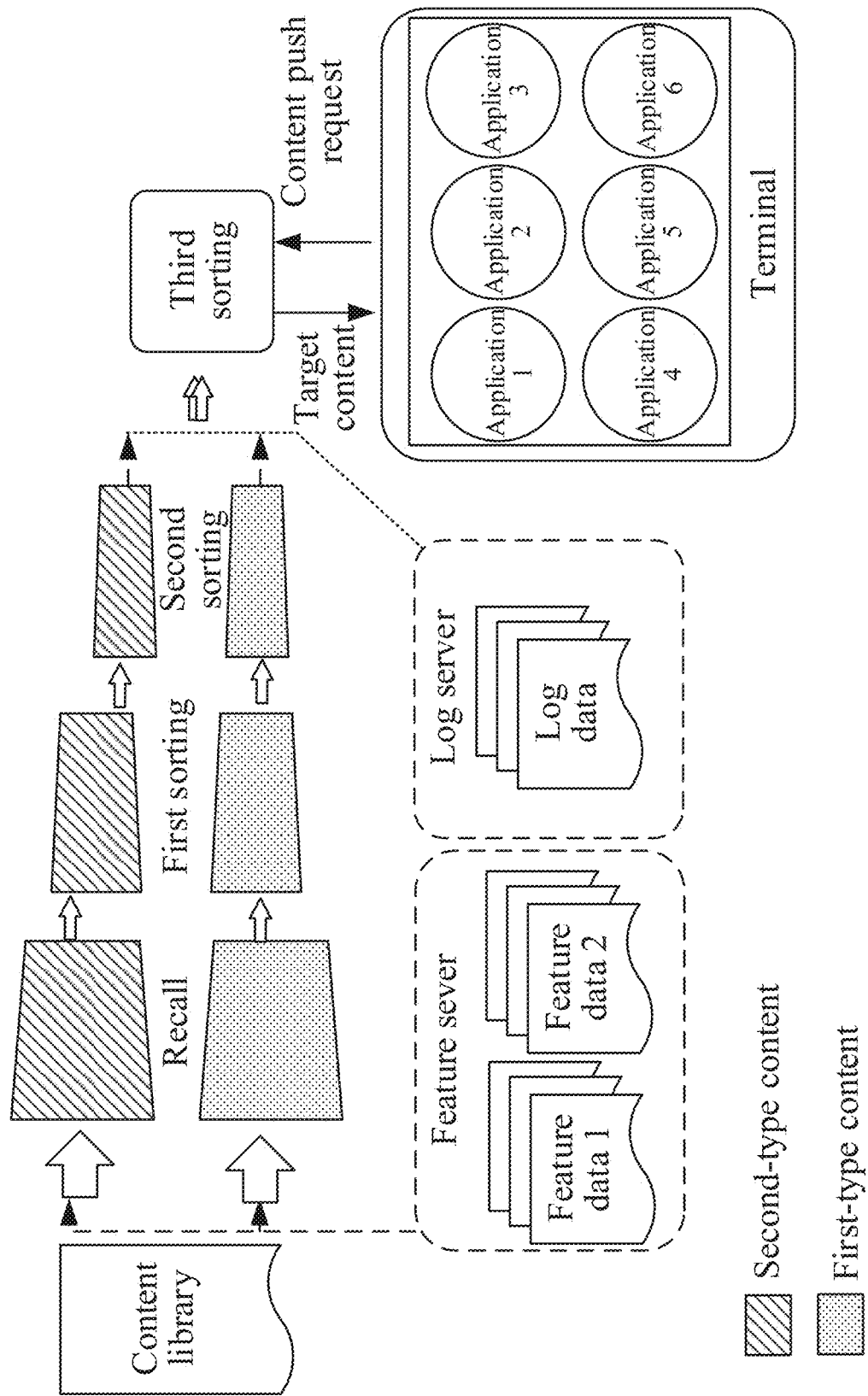
FIG. 5 is a schematic diagram of a content push principle according to an embodiment.

In an embodiment, as shown in FIG. 5, the terminal can generate a content push request carrying an object identifier and transmit the content push request to the server. After receiving the content push request, the server can obtain feature data 1 (that is, the dynamic sample resource input information of the first-type sample content and the sample content feature of the second-type sample content) and feature data 2 (that is, inherent attribute information of the sample object) of content corresponding to the object identifier from a feature server, and obtain log data (that is, the behavioral attribute information of the sample object) corresponding to the object identifier from a log server. The server can recall content matching the content push request from a content library based on corresponding feature data 1, feature data 2, and log data, and sort the recalled content twice to select a candidate mixed content. Further, the server can sort the candidate mixed content for the third time by using the content push method of this application, determine a target to-be-pushed content from the mixed content based on a sorting result, and push the target to-be-push content to the terminal. The object attribute information of the sample object includes the inherent attribute information and the behavioral attribute information.

Figure 6:
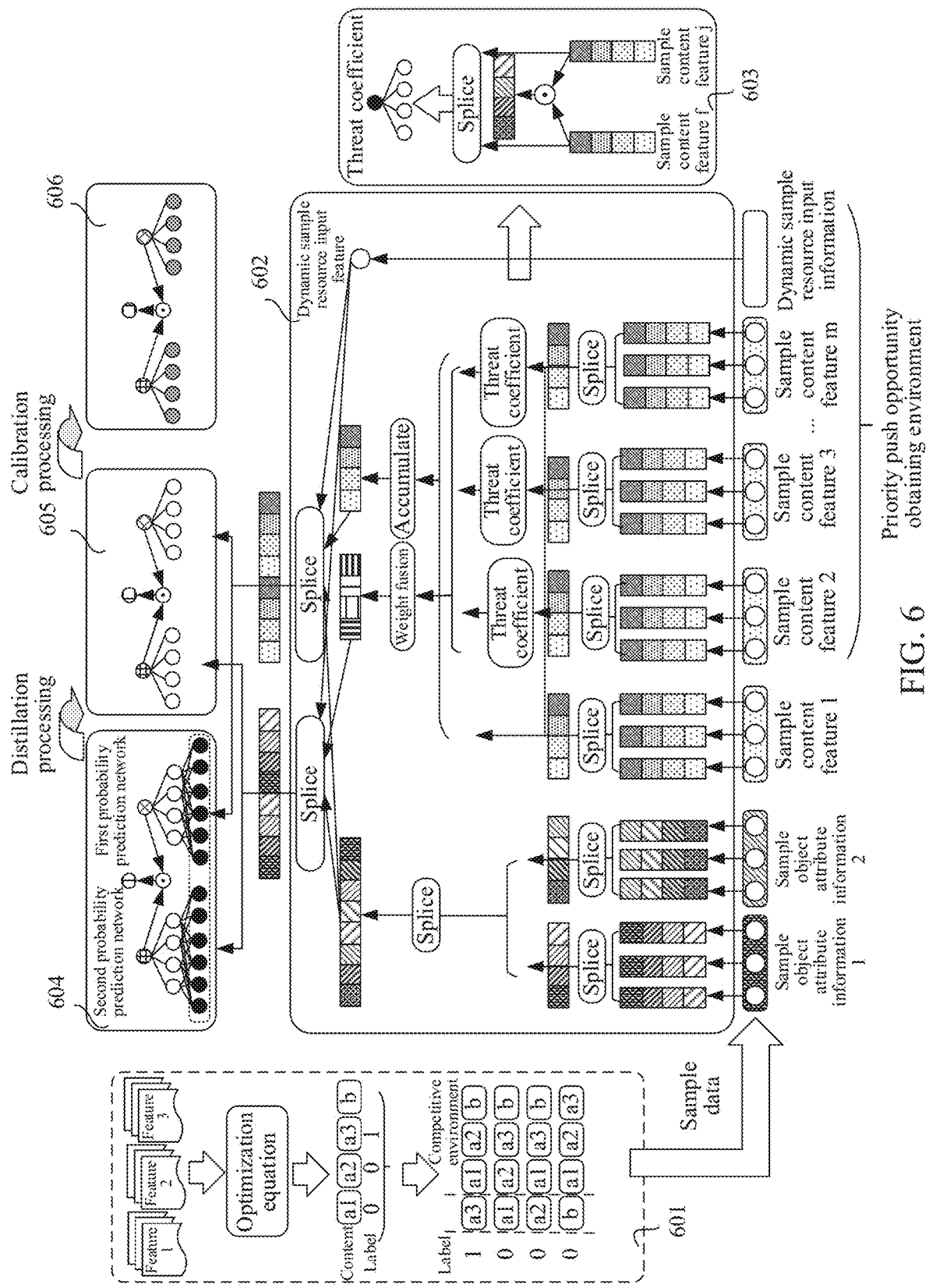
FIG. 6 is a schematic diagram of a model framework of a content sorting model according to an embodiment.

In an embodiment, as shown in FIG. 6, referring to a region 601 in FIG. 6, the server can obtain a feature 1, a feature 2, and a feature 3. The feature 1 includes the dynamic sample resource input information of the first-type sample content and the sample content feature of the second-type sample content, and the feature 2 and the feature 3 are the object attribute information of the sample object. The server can solve the pre-built optimization equation based on the sample object attribute information, the dynamic sample resource input information, and the sample content feature, and determine a content push result corresponding to each sample content push request based on a solving result. The server can label the first-type sample content and the second-type sample content based on the content push result, to obtain the first sorting label for the first-type sample content and the second-type sample content, thereby obtaining sample data for training the content sorting model.

Referring to a region 602 in FIG. 6, the server can encode sample object attribute information 1 (that is, the inherent attribute information of the sample object) and sample object attribute information 2 (that is, the behavioral attribute information of the sample object), and splice the encoded features to obtain the object attribute feature corresponding to the object attribute information. The server can accumulate the content features of all pieces of second-type content to obtain the overall content feature. For each piece of second-type content, the server can determine the threat coefficient of the remaining content to the second-type content based on the content feature (for example, a sample content feature 1) corresponding to the second-type content and the content feature (for example, a sample content feature 2-m, m representing a quantity of the second-type content) corresponding to the remaining content, and perform weight fusion on the content features respectively corresponding to all pieces of second-type content based on the threat coefficients respectively corresponding to all pieces of second-type content, to obtain the internal priority push feature. The server can splice the object attribute feature, the internal priority push feature, and the dynamic resource input feature, and input the spliced feature into a second probability prediction network of a to-be-trained content sorting model in a region 604, to predict sample priority push condition probabilities respectively corresponding to all pieces of second-type content. The server can splice the object attribute feature, the internal priority push feature, and the dynamic resource input feature, and input the spliced feature into a first probability prediction network in the to-be-trained content sorting model in the region 604, to predict the first sample priority push probability corresponding to all pieces of first-type content. The server can determine second sample priority push probabilities respectively corresponding to all pieces of second-type content based on the first sample priority push probability and the sample priority push condition probabilities. In this way, the server can iteratively train the to-be-trained content sorting model based on differences between the second sample priority push probabilities and the first sorting labels respectively corresponding to the first-type sample content, to obtain a trained content sorting model.

It may be understood that the threat coefficients respectively corresponding to all pieces of second-type content may be calculated by using a threat unit shown in a region 603 of FIG. 6. Specifically, for each piece of second-type content f, a threat coefficient of a remaining content to the second-type content is determined based on a sample content feature corresponding to the second-type content f and a sample content feature corresponding to the remaining content j.

It may be understood that, a content sorting model shown in a region 605 of FIG. 6 is obtained by performing distillation processing on the initial content sorting model shown in the region 604. A content sorting model shown in a region 606 of FIG. 6 is obtained by calibrating the content sorting model shown in the region 605.

Figure 7:
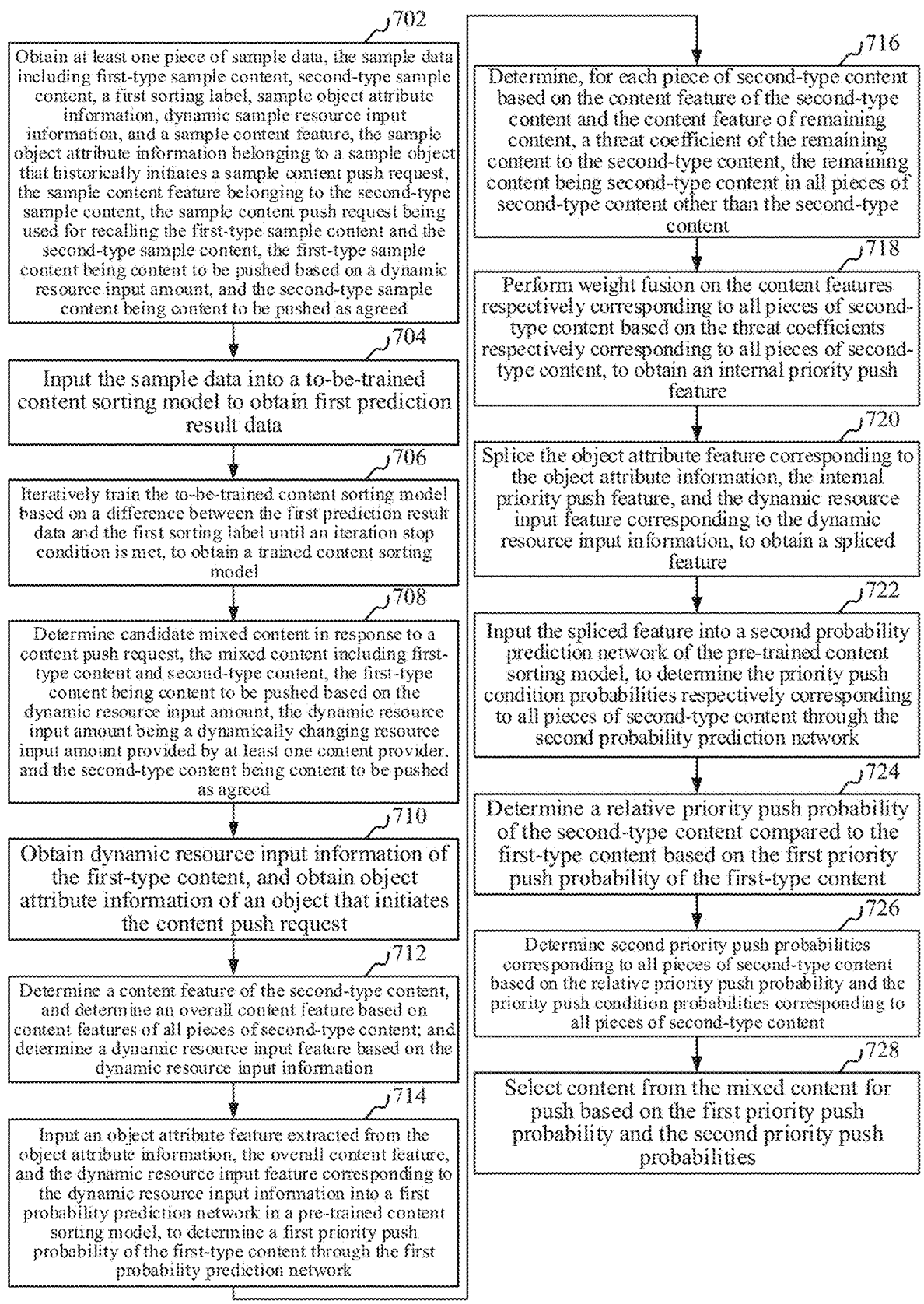
FIG. 7 is a schematic flowchart of a content push method according to another embodiment.

In an embodiment, as shown in FIG. 7, a content push method is provided. This method is described by using an example in which the method is applied to the server 104 in FIG. 1. The method specifically includes the following steps:

Step 702: Obtain at least one piece of sample data, the sample data including first-type sample content, second-type sample content, a first sorting label, sample object attribute information, dynamic sample resource input information, and a sample content feature, the sample object attribute information belonging to a sample object that historically initiates a sample content push request, the sample content feature belonging to the second-type sample content, the sample content push request being used for recalling the first-type sample content and the second-type sample content, the first-type sample content being content to be pushed based on a dynamic resource input amount, and the second-type sample content being content to be pushed as agreed.

Step 704: Input the sample data into a to-be-trained content sorting model to obtain first prediction result data.

Step 706: Iteratively train the to-be-trained content sorting model based on a difference between the first prediction result data and the first sorting label until an iteration stop condition is met, to obtain a trained content sorting model.

Step 708: Determine candidate mixed content in response to a content push request, the mixed content including first-type content and second-type content, the first-type content being content to be pushed based on the dynamic resource input amount, the dynamic resource input amount being a dynamically changing resource input amount provided by at least one content provider, and the second-type content being content to be pushed as agreed.

Step 710: Obtain dynamic resource input information of the first-type content, and obtain object attribute information of an object that initiates the content push request.

Step 712: Determine a content feature of the second-type content, and determine an overall content feature based on content features of all pieces of second-type content; and determine a dynamic resource input feature based on the dynamic resource input information.

Step 714: Input an object attribute feature corresponding to the object attribute information, the overall content feature, and the dynamic resource input feature corresponding to the dynamic resource input information into a first probability prediction network in a pre-trained content sorting model, to determine a first priority push probability of the first-type content through the first probability prediction network.

Step 716: Determine, for each piece of second-type content based on the content feature of the second-type content and the content feature of remaining content, a threat coefficient of the remaining content to the second-type content, the remaining content being second-type content in all pieces of second-type content other than the second-type content.

Step 718: Perform weight fusion on the content features respectively corresponding to all pieces of second-type content based on the threat coefficients respectively corresponding to all pieces of second-type content, to obtain an internal priority push feature.

Step 720: Splice the object attribute feature extracted from the object attribute information, the internal priority push feature, and the dynamic resource input feature corresponding to the dynamic resource input information, to obtain a spliced feature.

Step 722: Input the spliced feature into a second probability prediction network of the pre-trained content sorting model, to determine the priority push condition probabilities respectively corresponding to all pieces of second-type content through the second probability prediction network.

Step 724: Determine a relative priority push probability of the second-type content compared to the first-type content based on the first priority push probability of the first-type content.

Step 726: Determine second priority push probabilities corresponding to all pieces of second-type content based on the relative priority push probability and the priority push condition probabilities corresponding to all pieces of second-type content.

Step 728: Select content from the mixed content for push based on the first priority push probability and the second priority push probabilities.

This application further provides an application scenario. The foregoing content push method is applied to the application scenario. Specifically, the content push method may be applied to an advertisement push scenario. The server can obtain at least one piece of sample data, the sample data including first-type sample content, second-type sample content, a first sorting label, sample object attribute information, dynamic sample resource input information, and a sample content feature, the sample object attribute information belonging to a sample object that historically initiates a sample content push request, the sample content feature belonging to the second-type sample content, the sample content push request being used for recalling the first-type sample content and the second-type sample content, the first-type sample content being content to be pushed based on the dynamic resource input amount, and the second-type sample content being content to be pushed as agreed; input the sample data into a to-be-trained advertisement sorting model to obtain first prediction result data; and iteratively train the to-be-trained advertisement sorting model based on a difference between the first prediction result data and the first sorting label until an iteration stop condition is met, to obtain a trained content sorting model.

The server can receive the content push request and determine a candidate mixed advertisement in response to the content push request, the mixed advertisement including a first-type advertisement and a second-type advertisements, the first-type advertisement being an advertisement to be pushed based on a dynamic resource input amount, and the second-type advertisement being an advertisement to be pushed as agreed, the dynamic resource input amount being a dynamically changing resource input amount provided by at least one advertisement provider; determine dynamic resource input information of the first-type advertisement, obtain object attribute information of an object that initiates the content push request, determine an advertisement feature of the second-type advertisement, and determine an overall advertisement feature based on advertisement features of all second-type advertisements; determine a dynamic resource input feature based on the dynamic resource input information. input an object attribute feature corresponding to the object attribute information, the overall advertisement feature, and the dynamic resource input feature corresponding to the dynamic resource input information into a first probability prediction network in a pre-trained advertisement sorting model, to determine the first priority push probability of the first-type advertisement through the first probability prediction network.

The server can determine, for each piece of second-type advertisement based on the advertisement feature of the second-type advertisement and the advertisement feature of a remaining advertisement, a threat coefficient of the remaining advertisement to the second-type advertisement, the remaining advertisement being a second-type advertisement in all second-type advertisements other than the second-type advertisement; and perform weight fusion on the advertisement features respectively corresponding to the second-type advertisements based on the threat coefficients respectively corresponding to the second-type advertisements, to obtain an internal priority push feature; splice the object attribute feature extracted from the object attribute information, the internal priority push feature, and the dynamic resource input feature corresponding to the dynamic resource input information, to obtain a spliced feature; input the spliced feature into a second probability prediction network of the pre-trained advertisement sorting model, to determine priority push condition probabilities respectively corresponding to the second-type advertisements through the second probability prediction network; determine a relative priority push probability of the second-type advertisement compared to the first-type advertisement based on the first priority push probability of the first-type advertisement; and determine second priority push probabilities respectively corresponding to the second-type advertisements based on the relative priority push probability and the priority push condition probabilities respectively corresponding to the second-type advertisements.

The server can sort the first-type advertisement and the second-type advertisement in the mixed advertisement based on the first priority push probability and the second priority push probabilities. The server can select a target advertisement from the candidate mixed advertisement based on the sorting result and push the target advertisement to the terminal. The terminal can receive the target advertisement and display the target advertisement on a display interface. Through the content push method of this application, advertisement push accuracy can be improved.

This application further provides an application scenario. The foregoing content push method is applied to the application scenario. Specifically, the content further includes at least one of articles, videos, and images, and the content push method may be applied to scenarios such as article push, video push, and image push. It may be understood that, sorting is also involved in the scenarios such as article push, video push, and image push. In the article push scenario, articles may be sorted by using the content push method of this application, and corresponding articles may be pushed to the terminal based on a sorting result. In the video push scenario, videos may be sorted by using the content push method of this application, and corresponding videos may be pushed to the terminal based on a sorting result. In the image push scenario, images may be sorted by using the content push method of this application, and corresponding images may be pushed to the terminal based on a sorting result. It may be understood that, through the content push method of this application, accuracy of article push, video push, and image push can be improved.

It is to be understood that, although the steps are displayed sequentially in the flowcharts of the embodiments, these steps are not necessarily performed sequentially according to the sequence. Unless otherwise explicitly specified in this specification, execution of the steps is not strictly limited, and the steps may be performed in another sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 8:
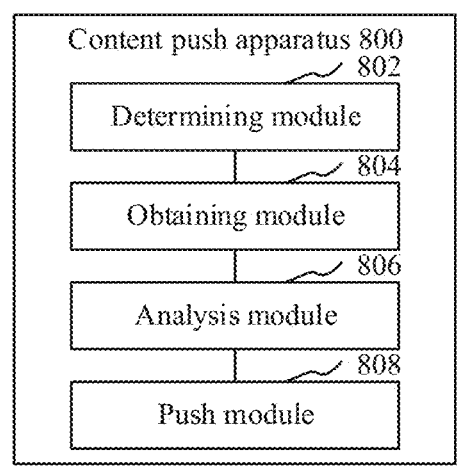
FIG. 8 is a structural block diagram of a content push apparatus according to an embodiment.

In an embodiment, as shown in FIG. 8, a content push apparatus 800 is provided. The apparatus may be a software module, a hardware module, or a combination thereof to be incorporated as a part of a computer device. The apparatus specifically includes:

a determining module 802, configured to determine candidate mixed content in response to a content push request, the mixed content including first-type content and second-type content, the first-type content being content to be pushed based on a dynamic resource input amount, the dynamic resource input amount being a dynamically changing resource input amount provided by at least one content provider, and the second-type content being content to be pushed as agreed;

an obtaining module 804, configured to obtain dynamic resource input information of the first-type content, and obtaining object attribute information of an object initiating the content push request;

the determining module 802 being further configured to: determine a content feature of the second-type content, and determine an overall content feature based on content features of all pieces of second-type content; and determine a dynamic resource input feature based on the dynamic resource input information;

an analysis module 806, configured to: determine a first priority push probability of the first-type content based on the object attribute information, the overall content feature, and the dynamic resource input feature; and analyze a priority push relationship between the content features of all pieces of second-type content, to obtain an internal priority push feature, and perform inter-type priority push relationship analysis based on the object attribute information, the internal priority push feature, and the dynamic resource input feature, to determine second priority push probabilities corresponding to all pieces of second-type content;

a push module 808, configured to select content from the mixed content for push based on the first priority push probability and the second priority push probabilities.

In an embodiment, the analysis module 806 is further configured to: determine, for each piece of second-type content based on the content feature of the second-type content and the content feature of remaining content, a threat coefficient of the remaining content to the second-type content, the remaining content being second-type content in all pieces of second-type content other than the second-type content; and perform weight fusion on the content features respectively corresponding to all pieces of second-type content based on the threat coefficients respectively corresponding to all pieces of second-type content, to obtain the internal priority push feature.

In an embodiment, the analysis module 806 is further configured to: splice an object attribute feature extracted from the object attribute information, the internal priority push feature, and the dynamic resource input feature, to obtain a spliced feature; determine priority push condition probabilities respectively corresponding to all pieces of second-type content based on the spliced feature; and determine the second priority push probabilities corresponding to all pieces of second-type content based on the first priority push probability of the first-type content and the priority push condition probabilities respectively corresponding to all pieces of second-type content.

In an embodiment, the analysis module 806 is further configured to: input the object attribute feature of the object attribute information, the overall content feature, and the dynamic resource input feature into a first probability prediction network in a pre-trained content sorting model, to determine the first priority push probability of the first-type content through the first probability prediction network; input the spliced feature into a second probability prediction network of the pre-trained content sorting model, to determine the priority push condition probabilities respectively corresponding to all pieces of second-type content through the second probability prediction network.

In an embodiment, the analysis module 806 is further configured to: determine a relative priority push probability of the second-type content compared to the first-type content based on the first priority push probability of the first-type content; and determine the second priority push probabilities respectively corresponding to all pieces of second-type content based on the relative priority push probability and the priority push condition probabilities respectively corresponding to all pieces of second-type content.

In an embodiment, the push module 808 is further configured to: perform mixed sorting on the first-type content and the second-type content in the mixed content based on a magnitude relationship between the first priority push probability and the second priority push probabilities, to obtain a mixed sorting queue; and select the content from the mixed content for push based on the mixed sorting queue.

In an embodiment, the to-be-pushed content is selected based on a sorting result obtained by the pre-trained content sorting model by sorting the mixed content, the sorting of the mixed content is performed by the content sorting model based on the first priority push probability and the second priority push probabilities, and the apparatus further includes:

a first training module, configured to: at least one piece of sample data, the sample data including first-type sample content, second-type sample content, a first sorting label, sample object attribute information, dynamic sample resource input information, and a sample content feature, the sample object attribute information belonging to a sample object that historically initiates a sample content push request, the sample content feature belonging to the second-type sample content, the sample content push request being used for recalling the first-type sample content and the second-type sample content, the first-type sample content being content to be pushed based on the dynamic resource input amount, and the second-type sample content being content to be pushed as agreed; input the sample data into a to-be-trained content sorting model to obtain first prediction result data; and iteratively train the to-be-trained content sorting model based on a difference between the first prediction result data and the first sorting label until an iteration stop condition is met, to obtain a trained content sorting model.

In an embodiment, the first training module is further configured to: obtain sample object attribute information of at least one sample object, obtaining at least one piece of first-type sample content, obtaining dynamic sample resource input information of the first-type sample content, obtaining at least one piece of second-type sample content, and obtaining a sample content feature of the second-type sample content; determine a content push result corresponding to each sample content push request based on the sample object attribute information, the dynamic sample resource input information, and the sample content feature, the sample content push request being a request transmitted by a terminal corresponding to the sample object; label, for the content push result corresponding to each sample content push request based on the content push result corresponding to each sample content push request, first-type sample content and second-type sample content recalled by the sample content push request, to obtain the first sorting label.

In an embodiment, the first training module is further configured to: determine a first distillation loss based on the difference between the first prediction result data and the first sorting label; iteratively train the to-be-trained content sorting model through the first distillation loss until the iteration stop condition is met, to obtain an initial content sorting model; determine a second distillation loss based on a difference between first distillation result data and second distillation result data, the first distillation result data being result data outputted by the to-be-trained content sorting model, and the second distillation result data being result data outputted by the initial content sorting model; and perform distillation processing on the initial content sorting model based on the first distillation loss and the second distillation loss, to obtain the trained content sorting model.

In an embodiment, the first distillation result data includes first target distillation result data and first intermediate distillation result data, and the second distillation result data includes second target distillation result data and second intermediate distillation result data. The first training module is further configured to: determine a target result distillation loss based on a difference between the first target distillation result data and the second target distillation result data; determine an intermediate result distillation loss based on a difference between the first intermediate distillation result data and the second intermediate distillation result data; and determine the second distillation loss based on the target result distillation loss and the intermediate result distillation loss.

In an embodiment, the to-be-pushed content is selected based on the sorting result obtained by the pre-trained content sorting model by sorting the mixed content, the sorting of the mixed content is performed by the content sorting model based on the first priority push probability and the second priority push probabilities, and the apparatus further includes:

a second training module, configured to: obtain, for each model update period, periodic sample data corresponding to the model update period, the periodic sample data including first-type calibration content, second-type calibration content, a second sorting label, calibration object attribute information, dynamic calibration resource input information, and a calibration content feature, the calibration object attribute information belonging to a calibration object that historically initiates a calibration content push request, the calibration content feature belonging to the second-type calibration content, the calibration content push request being used for recalling the first-type calibration content and the second-type calibration content, the first-type calibration content being content to be pushed based on the dynamic resource input amount, and the second-type calibration content being content to be pushed as agreed; input the periodic sample data into a content sorting model obtained by updating in a previous model update period, to obtain second prediction result data corresponding to a current model update period; determine a first calibration loss based on a difference between the second prediction result data and the second sorting label; determine a second calibration loss based on a difference between first calibration result data and second calibration result data, the first calibration result data being result data outputted by the content sorting model obtained by updating in the previous model update period, and the second calibration result data being result data outputted by a content sorting model obtained by updating in a preceding model update period, the preceding model update period being a model update period before the previous model update period; and update the content sorting model obtained by updating in the previous model update period based on the first calibration loss and the second calibration loss.

In an embodiment, the first calibration result data includes first target calibration result data and first intermediate calibration result data, and the second calibration result data includes second target calibration result data and second intermediate calibration result data. The second training module is configured to: determine a target result calibration loss based on a difference between the first target calibration result data and the second target calibration result data; determine an intermediate result calibration loss based on a difference between the first intermediate calibration result data and the second intermediate calibration result data; and determine the second calibration loss based on the target result calibration loss and the intermediate result calibration loss.

Figure 9:
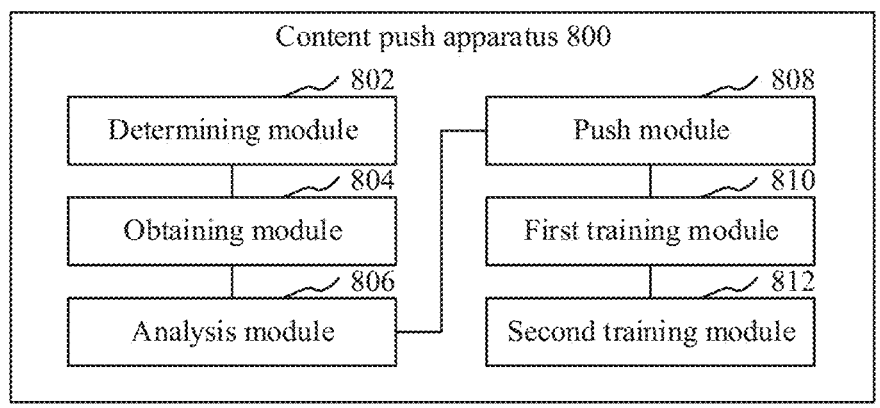
FIG. 9 is a structural block diagram of a content push apparatus according to another embodiment.

As shown in FIG. 9, in an embodiment, the foregoing content push apparatus 800 may further include a first training module 810 and a second training module 812.

In an embodiment, the content push request is an advertisement push request, and the mixed content is a mixed advertisement, the mixed advertisement including a first-type advertisement and a second-type advertisement, the first-type advertisement being an advertisement to be pushed based on a bid of an advertisement provider, and the second-type advertisement being an advertisement to be pushed as agreed with the advertisement provider.

In the foregoing content push apparatus, the content push request is received, and the candidate mixed content is determined in response to the content push request, the mixed content including the first-type content and the second-type content, the first-type content being content to be pushed based on the dynamic resource input amount, and the second-type content being content to be pushed as agreed; the dynamic resource input information of the first-type content and the content feature of the second-type content are determined, and the overall content feature is determined based on the content features of all pieces of second-type content; the first priority push probability of the first-type content is determined based on the object attribute information, the overall content feature, and the dynamic resource input feature corresponding to the dynamic resource input information; and the priority push relationship between the content features of all pieces of second-type content is analyzed, to obtain the internal priority push feature, and the inter-type priority push relationship analysis is performed based on the object attribute information, the internal priority push feature, and the dynamic resource input feature, to determine the second priority push probabilities corresponding to all pieces of second-type content. During the calculation of the first priority push probability and the second priority push probabilities, the object attribute information corresponding to the content push request, as well as the real-time dynamic resource input information of the first-type content and the content feature of the second-type content are considered. Therefore, the first priority push probability and the second priority push probabilities are data calculated for the request level. Further, at least partial content is selected from the mixed content for push based on the first priority push probability and the second priority push probabilities, which can improve the content push accuracy and avoid a waste of hardware resources that support a push function.

All or some of modules in the content push apparatus may be implemented by software, hardware, or a combination thereof. The foregoing modules may be built in or independent of a processor of a computer device in a form of hardware, or may be stored in a memory of the computer device in a form of software, so that the processor invokes each of the foregoing modules to perform an operation corresponding to the module.

In an embodiment, a computer device is provided. The computer device may be a server. An internal structure diagram of the server may be shown in FIG. 10. The computer device includes a processor, a storage, an input/output (I/O for short) interface, and a communication interface. The processor, the storage, and the I/O interface are connected through a system bus, and the communication interface is connected to the system bus through the I/O interface. The processor of the computer device is configured to provide computing and control capabilities. The storage of the computer device includes a non-volatile storage medium and an internal memory. The non-volatile storage medium stores an operating system, a computer program, and a database. The internal memory provides an environment for running of the operating system and the computer program in the non-volatile storage medium. The I/O interface of the computer device is configured for information exchange between the processor and the external device. The communication interface of the computer device is configured to connect to and communicate with an external terminal through a network. The computer program, when executed by the processor, implements the content push method.

Figure 10:
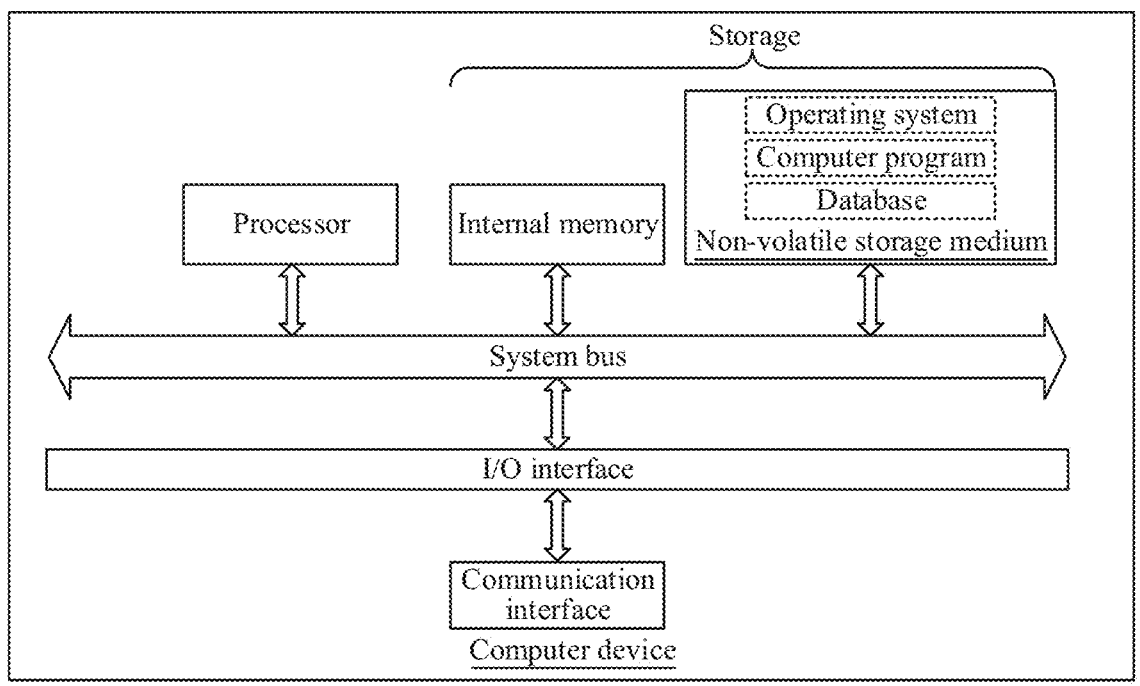
FIG. 10 is a diagram of an internal structure of a computer device according to an embodiment.

A person skilled in the art may understand that, the structure shown in FIG. 10 is merely a block diagram of a partial structure related to the solution in this application, and does not constitute a limitation to the computer device to which the solution in this application is applied. Specifically, the computer device may include more components or fewer components than those shown in the figure, or some merged components, or different component arrangements.

In an embodiment, a computer device is further provided, including a memory and one or more processors. The memory has computer-readable instructions stored therein. The one or more processors, when executing the computer-readable instructions, cause the computer device to implement the steps in the foregoing method embodiments.

In an embodiment, one or more non-transitory computer-readable storage media are provided, having computer-readable instructions stored therein. The computer-readable instructions, when executed by a processor of a computer device, cause the computer device to implement the steps in the foregoing method embodiments.

In an embodiment, a computer program product is further provided, including computer-readable instructions. The computer-readable instructions, when executed by a processor, implement the steps in the foregoing method embodiments.

The user information (including but not limited to user equipment information and personal user information) and data (including but not limited to data for analysis, stored data, and displayed data) involved in this application are all information and data authorized by the user or fully authorized by all parties. The collection, use, and processing of relevant data need to comply with the relevant laws, regulations, and standards of relevant countries and regions.

A person of ordinary skill in the art may understand that all or some of processes of the method in the foregoing embodiments may be implemented by a computer program instructing relevant hardware. The computer program may be stored in a non-volatile computer-readable storage medium. When the computer program is executed, the processes of the foregoing method embodiments can be implemented. Any reference to the memory, the storage, the database, or other media used in the embodiments provided in this application may include at least one of a non-volatile memory and a volatile memory. The non-volatile memory may include a read-only memory (ROM), a magnetic tape, a floppy disk, a flash memory, an optical memory, or the like. The non-volatile memory may further include a random access memory (RAM) or an external cache. As a description rather than a limitation, the RAM may have various forms, such as a static random access memory (SRAM) or a dynamic random access memory (DRAM).

In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The technical features of the foregoing embodiments may be randomly combined. To make the description concise, not all possible combinations of the technical features in the foregoing embodiments are described. However, the combinations of these technical features are considered as falling within the scope recorded in this specification provided that no conflict exists.

The foregoing embodiments describe only some implementations of this application, which are described specifically and in detail, but cannot be construed as a limitation to the patent scope of this application. For a person of ordinary skill in the art, some transformations and improvements may be made without departing from the idea of this application. These transformations and improvements belong to the protection scope of this application. Therefore, the protection scope of the patent of this application is subject to the appended claims.

What is claimed is:

1. A method performed by a computer device, comprising:
   determining candidate mixed content in response to a content push request, the determined candidate mixed content comprising a first-type content and a second-type content, the first-type content being content to be pushed based on a dynamic resource input amount and the second-type content including multiple pieces of content to be pushed as agreed;
   determining dynamic resource input information of the first-type content;
   determining an overall content feature based on content features of the multiple pieces of the second-type content;
   determining a first priority push probability of the first-type content based on an object attribute information of an object that initiates the content push request, the overall content feature, and the determined dynamic resource input information;
   determining second priority push probabilities respectively corresponding to the pieces of second-type content based on the object attribute information, the dynamic resource input information, and a priority push relationship between the content features of the multiple pieces of the second-type content; and
   selecting content from the determined candidate mixed content for push to the object that initiates the content push request based on the determined first priority push probability and the determined second priority push probabilities.

2. The method according to claim 1, wherein an internal priority push feature is obtained from the priority push relationship between the content features of the multiple pieces of the second-type content.

3. The method according to claim 2, wherein the determining the second priority push probabilities respectively corresponding to the multiple pieces of the second-type content based on the object attribute information, the dynamic resource input information, and the priority push relationship between the content features of the multiple pieces of the second-type content comprises:
   performing inter-type priority push relationship analysis based on the object attribute information, the obtained internal priority push feature, and the dynamic resource input information.

4. The method according to claim 3, wherein the performing inter-type priority push relationship analysis based on the object attribute information, the obtained internal priority push feature, and the determined dynamic resource input information comprises:
   splicing an object attribute feature extracted from the object attribute information, the obtained internal priority push feature, and the dynamic resource input information, to obtain a spliced feature;
   determining priority push condition probabilities respectively corresponding to the multiple pieces of the second-type content based on the obtained spliced feature; and
   determining the second priority push probabilities respectively corresponding to the multiple pieces of the second-type content based on the first priority push probability of the first-type content and the determined priority push condition probabilities respectively corresponding to the multiple pieces of the second-type content.

5. The method according to claim 1, wherein the selecting content from the determined candidate mixed content for push to the object that initiates the content push request based on the first priority push probability and the second priority push probabilities comprises:
   performing mixed sorting on the first-type content and the second-type content in the determined candidate mixed content based on a magnitude relationship between the first priority push probability and the second priority push probabilities, to obtain a mixed sorting queue; and selecting the content from the determined candidate mixed content for push to the object that initiates the content push request based on the obtained mixed sorting queue.

6. The method according to claim 1, wherein the dynamic resource input amount is a dynamically changing resource input amount provided by at least one content provider.

7. The method according to claim 1, wherein the content push request is an advertisement push request, and the determined candidate mixed content is a mixed advertisement, the mixed advertisement comprising a first-type advertisement and a second-type advertisement, the first-type advertisement being an advertisement to be pushed based on a bid of an advertisement provider, and the second-type advertisement being an advertisement to be pushed as agreed with the advertisement provider.

8. A computer device, comprising a memory and one or more processors, the memory having computer-readable instructions stored therein, and the computer-readable instructions, when executed by the processors, causing the computer device to perform a content push method including:
    determining candidate mixed content in response to a content push request, the determined candidate mixed content comprising a first-type content and a second-type content, the first-type content being content to be pushed based on a dynamic resource input amount and the second-type content including multiple pieces of content to be pushed as agreed;
    determining dynamic resource input information of the first-type content;
    determining an overall content feature based on content features of the multiple pieces of the second-type content;
    determining a first priority push probability of the first-type content based on an object attribute information of an object that initiates the content push request, the overall content feature, and the determined dynamic resource input information;
    determining second priority push probabilities respectively corresponding to the pieces of second-type content based on the object attribute information, the dynamic resource input information, and a priority push relationship between the content features of the multiple pieces of the second-type content; and
    selecting content from the determined candidate mixed content for push to the object that initiates the content push request based on the determined first priority push probability and the determined second priority push probabilities.

9. The computer device according to claim 8, wherein an internal priority push feature is obtained from the priority push relationship between the content features of the multiple pieces of the second-type content.

10. The computer device according to claim 9, wherein the determining the second priority push probabilities respectively corresponding to the multiple pieces of the second-type content based on the object attribute information, the dynamic resource input information, and the priority push relationship between the content features of the multiple pieces of the second-type content comprises:
    performing inter-type priority push relationship analysis based on the object attribute information, the obtained internal priority push feature, and the dynamic resource input information.

11. The computer device according to claim 10, wherein the performing inter-type priority push relationship analysis based on the object attribute information, the obtained internal priority push feature, and the determined dynamic resource input information comprises:
    splicing an object attribute feature extracted from the object attribute information, the obtained internal priority push feature, and the dynamic resource input information, to obtain a spliced feature;
    determining priority push condition probabilities respectively corresponding to the multiple pieces of the second-type content based on the obtained spliced feature; and
    determining the second priority push probabilities respectively corresponding to the multiple pieces of the second-type content based on the first priority push probability of the first-type content and the determined priority push condition probabilities respectively corresponding to the multiple pieces of the second-type content.

12. The computer device according to claim 8, wherein the selecting content from the determined candidate mixed content for push to the object that initiates the content push request based on the first priority push probability and the second priority push probabilities comprises:
    performing mixed sorting on the first-type content and the second-type content in the determined candidate mixed content based on a magnitude relationship between the first priority push probability and the second priority push probabilities, to obtain a mixed sorting queue; and
    selecting the content from the determined candidate mixed content for push to the object that initiates the content push request based on the obtained mixed sorting queue.

13. The computer device according to claim 8, wherein the dynamic resource input amount is a dynamically changing resource input amount provided by at least one content provider.

14. The computer device according to claim 8, wherein the content push request is an advertisement push request, and the determined candidate mixed content is a mixed advertisement, the mixed advertisement comprising a first-type advertisement and a second-type advertisement, the first-type advertisement being an advertisement to be pushed based on a bid of an advertisement provider, and the second-type advertisement being an advertisement to be pushed as agreed with the advertisement provider.

15. One or more non-transitory computer-readable storage media, having computer-readable instructions stored therein, the computer-readable instructions, when executed by a processor of a computer device, causing the computer device to perform a content push method including:
    determining candidate mixed content in response to a content push request, the determined candidate mixed content comprising a first-type content and a second-type content, the first-type content being content to be pushed based on a dynamic resource input amount and the second-type content including multiple pieces of content to be pushed as agreed;
    determining dynamic resource input information of the first-type content;
    determining an overall content feature based on content features of the multiple pieces of the second-type content;
    determining a first priority push probability of the first-type content based on an object attribute information of an object that initiates the content push request, the overall content feature, and the determined dynamic resource input information;

determining second priority push probabilities respectively corresponding to the pieces of second-type content based on the object attribute information, the dynamic resource input information, and a priority push relationship between the content features of the multiple pieces of the second-type content; and selecting content from the determined candidate mixed content for push to the object that initiates the content push request based on the determined first priority push probability and the determined second priority push probabilities.

16. The computer-readable storage media according to claim 15, wherein an internal priority push feature is obtained from the priority push relationship between the content features of the multiple pieces of the second-type content.

17. The computer-readable storage media according to claim 16, wherein the determining the second priority push probabilities respectively corresponding to the multiple pieces of the second-type content based on the object attribute information, the dynamic resource input information, and the priority push relationship between the content features of the multiple pieces of the second-type content comprises:

performing inter-type priority push relationship analysis based on the object attribute information, the obtained internal priority push feature, and the dynamic resource input information.

18. The computer-readable storage media according to claim 17, wherein the performing inter-type priority push relationship analysis based on the object attribute information, the obtained internal priority push feature, and the determined dynamic resource input information comprises:

splicing an object attribute feature extracted from the object attribute information, the obtained internal priority push feature, and the dynamic resource input information, to obtain a spliced feature;

determining priority push condition probabilities respectively corresponding to the multiple pieces of the second-type content based on the obtained spliced feature; and determining the second priority push probabilities respectively corresponding to the multiple pieces of the second-type content based on the first priority push probability of the first-type content and the determined priority push condition probabilities respectively corresponding to the multiple pieces of the second-type content.

19. The computer-readable storage media according to claim 15, wherein the selecting content from the determined candidate mixed content for push to the object that initiates the content push request based on the first priority push probability and the second priority push probabilities comprises:

performing mixed sorting on the first-type content and the second-type content in the determined candidate mixed content based on a magnitude relationship between the first priority push probability and the second priority push probabilities, to obtain a mixed sorting queue; and selecting the content from the determined candidate mixed content for push to the object that initiates the content push request based on the obtained mixed sorting queue.

20. The computer-readable storage media according to claim 15, wherein the content push request is an advertisement push request, and the determined candidate mixed content is a mixed advertisement, the mixed advertisement comprising a first-type advertisement and a second-type advertisement, the first-type advertisement being an advertisement to be pushed based on a bid of an advertisement provider, and the second-type advertisement being an advertisement to be pushed as agreed with the advertisement provider.

\* \* \* \* \*